United States Patent
Morimoto

(10) Patent No.: US 8,254,311 B2
(45) Date of Patent: Aug. 28, 2012

(54) BINDING UPDATE METHOD, MOBILE TERMINAL, HOME AGENT, AND BINDING UPDATE SYSTEM

(75) Inventor: Tetsuro Morimoto, Kanagawa (JP)

(73) Assignee: Panasonic Corporation, Osaka (JP)

( * ) Notice: Subject to any disclaimer, the term of this patent is extended or adjusted under 35 U.S.C. 154(b) by 618 days.

(21) Appl. No.: 12/445,360

(22) PCT Filed: Oct. 26, 2007

(86) PCT No.: PCT/JP2007/070895
§ 371 (c)(1),
(2), (4) Date: Apr. 13, 2009

(87) PCT Pub. No.: WO2008/053798
PCT Pub. Date: May 8, 2008

(65) Prior Publication Data
US 2010/0091703 A1    Apr. 15, 2010

(30) Foreign Application Priority Data

Oct. 30, 2006  (JP) ................................. 2006-294488

(51) Int. Cl.
*H04L 12/28*  (2006.01)
*H04W 4/00*  (2009.01)
*H04W 36/00*  (2009.01)
*G06F 15/173*  (2006.01)

(52) U.S. Cl. ........ 370/328; 370/252; 370/329; 370/331; 370/335; 370/338; 370/254; 370/389; 709/241; 709/245; 455/439

(58) Field of Classification Search .......... 370/252–474; 709/241–245
See application file for complete search history.

(56) References Cited

U.S. PATENT DOCUMENTS 6,490,259 B1 * 12/2002 Agrawal et al. ............... 370/331
(Continued)

FOREIGN PATENT DOCUMENTS

JP    2006-067091 A    3/2006
(Continued)

OTHER PUBLICATIONS

International Search Report for PCT/JP2007/070895.
(Continued)

*Primary Examiner* — Ayaz Sheikh
*Assistant Examiner* — Venkatesh Haliyur
(74) *Attorney, Agent, or Firm* — Pearne & Gordon LLP

(57) ABSTRACT

Disclosed in a technique for providing a binding update method and the like capable of resolving such a situation that a BA message keeps reciprocating between HAs. According to the technique, there is provided a binding update method, in which a mobile terminal transmits, to a home agent of the mobile terminal, a first message containing an address that is the destination to that the home agent forwards, and the home agent of the mobile terminal updates, based on the first message, a cache in which a home address of the mobile terminal is associated with an address that is the destination to that the home agent forwards, and transmits a second message as a reply to the first message to the mobile terminal, wherein when receiving the second message, the mobile terminal transmits, to the home agent of the mobile terminal, a third message notifying that the second message has been received, and after receiving the third message, the home agent of the mobile terminal updates the cache.

8 Claims, 20 Drawing Sheets

U.S. PATENT DOCUMENTS

| | | | | |
|---|---|---|---|---|
| 6,578,085 | B1* | 6/2003 | Khalil et al. | 709/241 |
| 6,769,000 | B1* | 7/2004 | Akhtar et al. | 1/1 |
| 6,804,221 | B1* | 10/2004 | Magret et al. | 370/338 |
| 7,039,035 | B2 | 5/2006 | Droms et al. | 370/338 |
| 7,079,499 | B1* | 7/2006 | Akhtar et al. | 370/310 |
| 7,082,130 | B2 | 7/2006 | Borella et al. | 370/389 |
| 7,155,500 | B2* | 12/2006 | Nikander | 709/223 |
| 7,257,104 | B2* | 8/2007 | Shitama | 370/338 |
| 7,299,044 | B2 | 11/2007 | Ikeda et al. | 455/436 |
| 7,308,506 | B1* | 12/2007 | Evans | 709/245 |
| 7,349,328 | B2* | 3/2008 | Watanabe | 370/218 |
| 7,385,957 | B2* | 6/2008 | O'Neill | 370/338 |
| 7,510,113 | B2* | 3/2009 | Igarashi et al. | 235/379 |
| 7,552,234 | B2* | 6/2009 | Thubert et al. | 709/238 |
| 7,738,871 | B2* | 6/2010 | Olvera-Hernandez et al. | 455/436 |
| 7,826,405 | B2* | 11/2010 | Shin et al. | 370/328 |
| 7,839,874 | B2* | 11/2010 | Zhao et al. | 370/401 |
| 7,840,217 | B2* | 11/2010 | Patel et al. | 455/439 |
| 7,886,075 | B2* | 2/2011 | Molteni et al. | 709/238 |
| 7,886,076 | B2* | 2/2011 | Brabson | 709/238 |
| 7,895,339 | B2* | 2/2011 | Hirano et al. | 709/227 |
| 7,912,008 | B2* | 3/2011 | Matsumoto et al. | 370/331 |
| 7,916,702 | B2* | 3/2011 | Hirano et al. | 370/338 |
| 7,937,578 | B2* | 5/2011 | O'Neill | 713/151 |
| 2002/0188562 | A1* | 12/2002 | Igarashi et al. | 705/40 |
| 2003/0104814 | A1* | 6/2003 | Gwon et al. | 455/436 |
| 2004/0004967 | A1* | 1/2004 | Nakatsugawa et al. | 370/400 |
| 2004/0066749 | A1* | 4/2004 | Watanabe | 370/242 |
| 2004/0095913 | A1* | 5/2004 | Westphal | 370/338 |
| 2004/0098622 | A1* | 5/2004 | O'Neill | 713/201 |
| 2004/0156346 | A1* | 8/2004 | O'Neill | 370/338 |
| 2004/0157585 | A1* | 8/2004 | Sashihara | 455/411 |
| 2004/0202183 | A1* | 10/2004 | Thubert et al. | 370/395.31 |
| 2004/0228343 | A1* | 11/2004 | Molteni et al. | 370/392 |
| 2004/0246933 | A1* | 12/2004 | Valko et al. | 370/338 |
| 2005/0099971 | A1* | 5/2005 | Droms et al. | 370/328 |
| 2006/0018291 | A1* | 1/2006 | Patel et al. | 370/335 |
| 2006/0140150 | A1* | 6/2006 | Olvera-Hernandez et al. | 370/331 |
| 2006/0171370 | A1* | 8/2006 | Matsumoto et al. | 370/351 |
| 2007/0160064 | A1* | 7/2007 | Kwon et al. | 370/395.52 |
| 2007/0160065 | A1* | 7/2007 | Mundra et al. | 370/395.52 |
| 2008/0019330 | A1* | 1/2008 | Hirano et al. | 370/338 |
| 2008/0120129 | A1* | 5/2008 | Seubert et al. | 705/1 |
| 2008/0137615 | A1* | 6/2008 | Park et al. | 370/332 |
| 2008/0207168 | A1* | 8/2008 | Forsberg | 455/411 |
| 2009/0109986 | A1* | 4/2009 | Zhao et al. | 370/401 |
| 2009/0170490 | A1* | 7/2009 | Brabson | 455/418 |
| 2009/0238111 | A1* | 9/2009 | Hirano et al. | 370/328 |
| 2009/0265453 | A1* | 10/2009 | Hirano et al. | 709/223 |
| 2010/0091703 | A1* | 4/2010 | Morimoto | 370/328 |
| 2010/0208691 | A1* | 8/2010 | Toyokawa | 370/331 |
| 2010/0246484 | A1* | 9/2010 | Hirano et al. | 370/328 |
| 2011/0064056 | A1* | 3/2011 | Zhao et al. | 370/331 |
| 2011/0116450 | A1* | 5/2011 | Hirano et al. | 370/328 |

FOREIGN PATENT DOCUMENTS

| | | |
|---|---|---|
| WO | 2006/106712 A1 | 10/2006 |
| WO | 2007/052691 A1 | 5/2007 |
| WO | 2007/108422 A1 | 9/2007 |

OTHER PUBLICATIONS

Johnson et al; "Mobility Support in IPv6" RFC3775 Nokia Research Center, Jun. 2004.

Perkins; "IP Mobility Support for IPv4" RFC3344 Nokia Research Center, Aug. 2002.

* cited by examiner

FIG. 1A
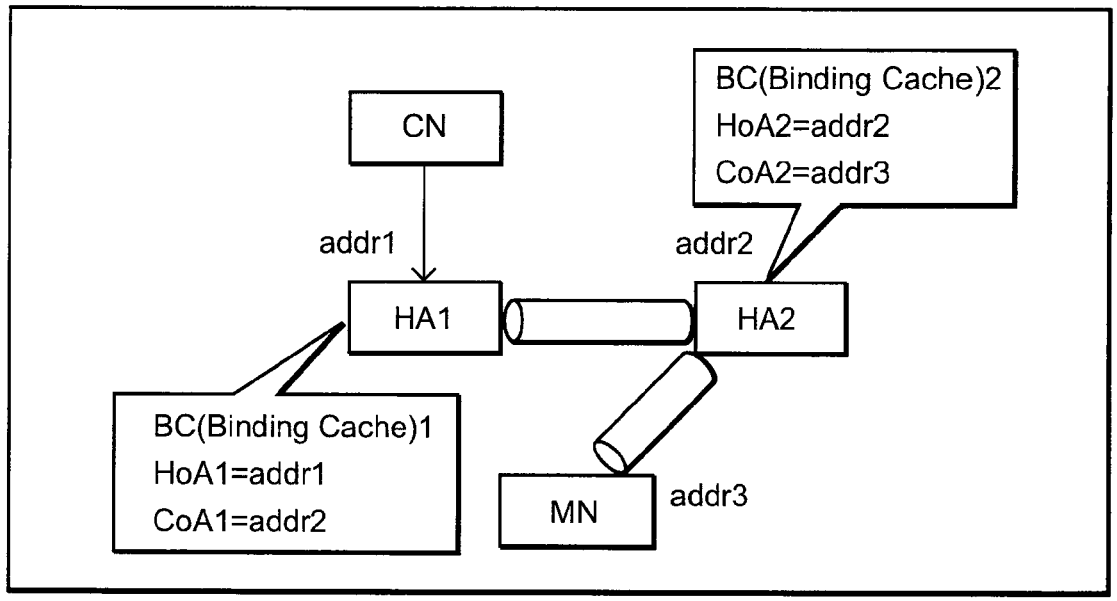
FIG. 1B
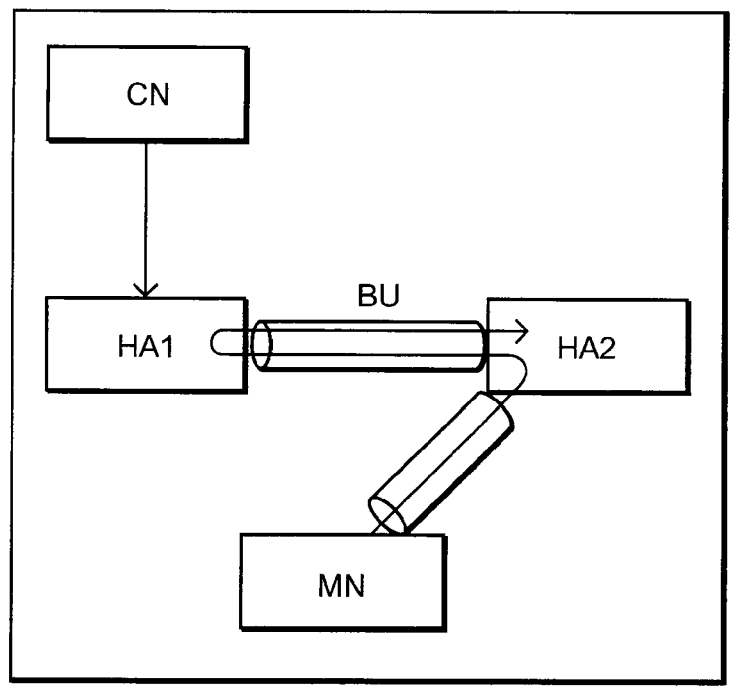

FIG. 1C
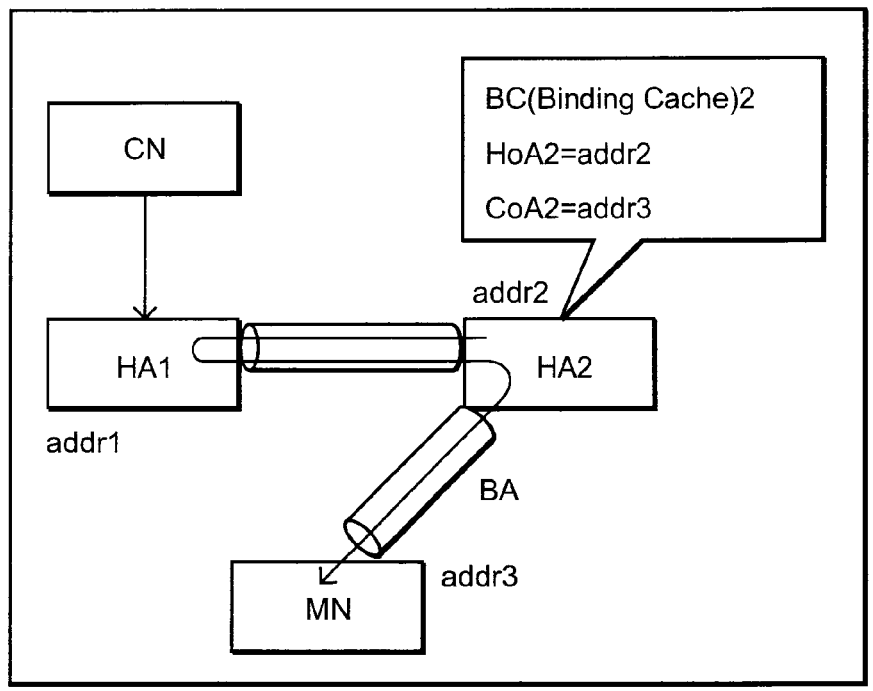
FIG. 1D
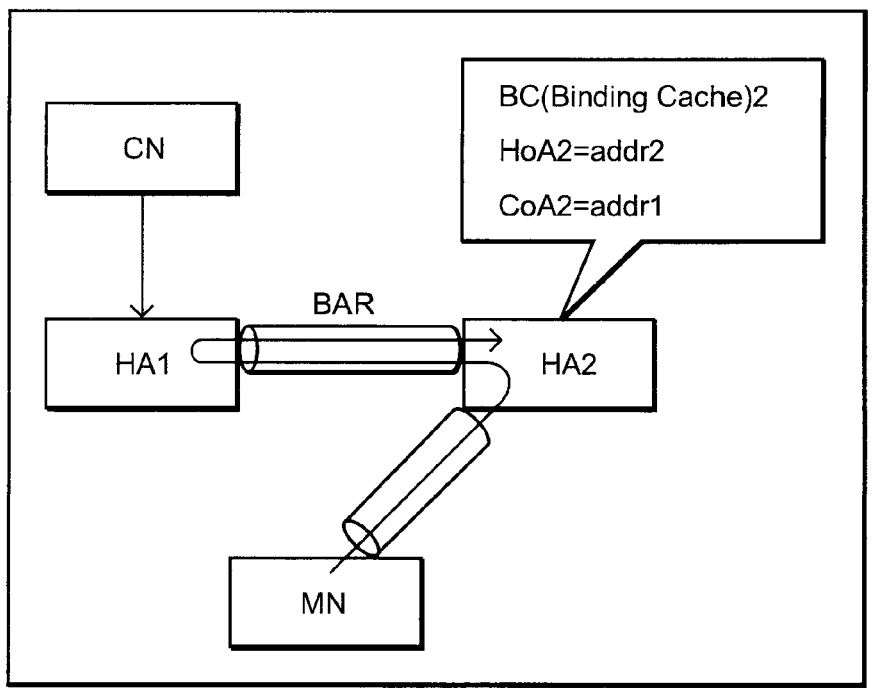

FIG. 2B
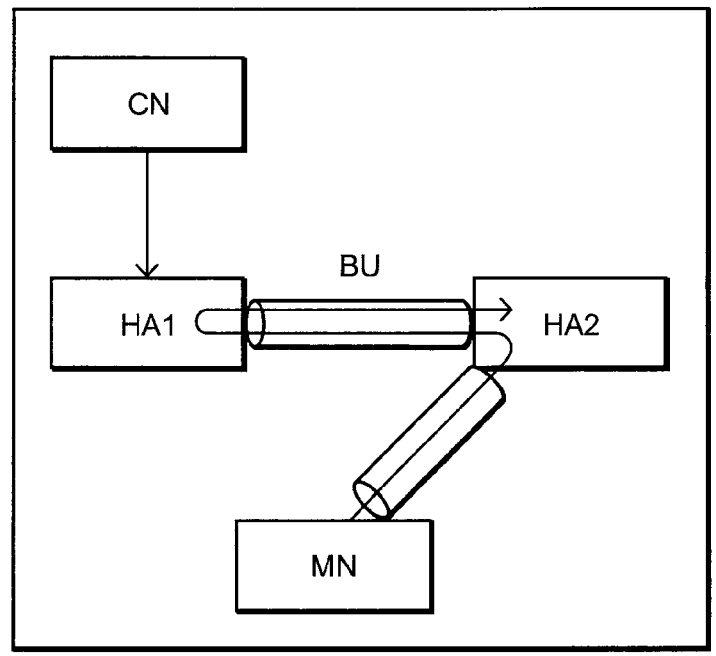
FIG. 2C
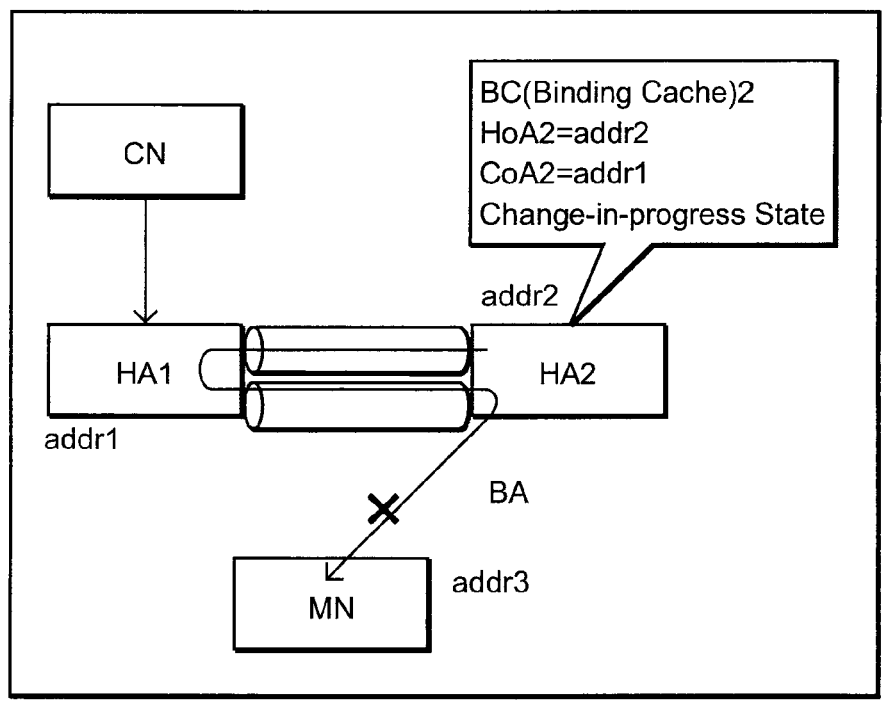

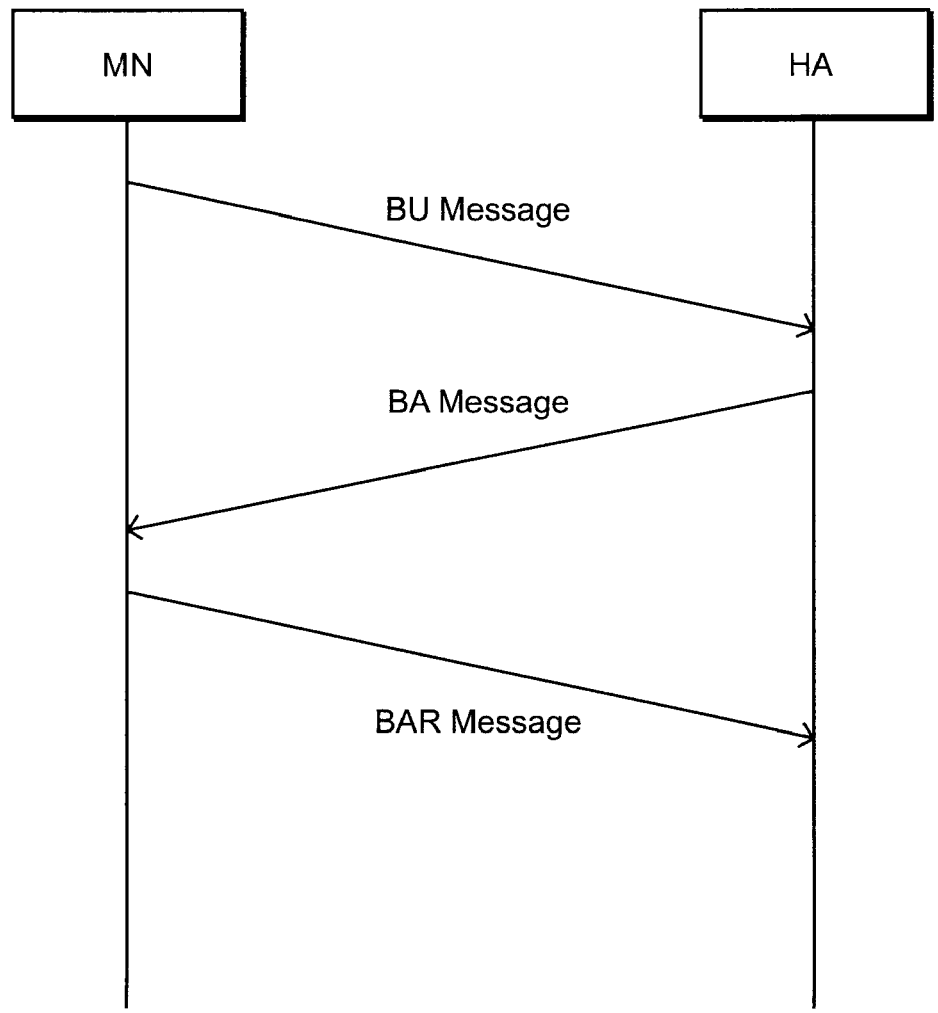

FIG. 5B

| Home Address (HoA) | Care-of Address (CoA) | State |
|---|---|---|
| Addr2 | Addr1 | Change-in-progress State |
| | | |
| | | |

FIG. 5C

| Home Address (HoA) | Care-of Address (CoA) | State |
|---|---|---|
| Addr2 | Addr1 | — |
| | | |
| | | |

FIG. 6

| Payload Protocol | Header Length | MH Type | Reserved |
|---|---|---|---|
| Check sum | | | |
| Message Data | | | |

FIG. 19B
PRIOR ART
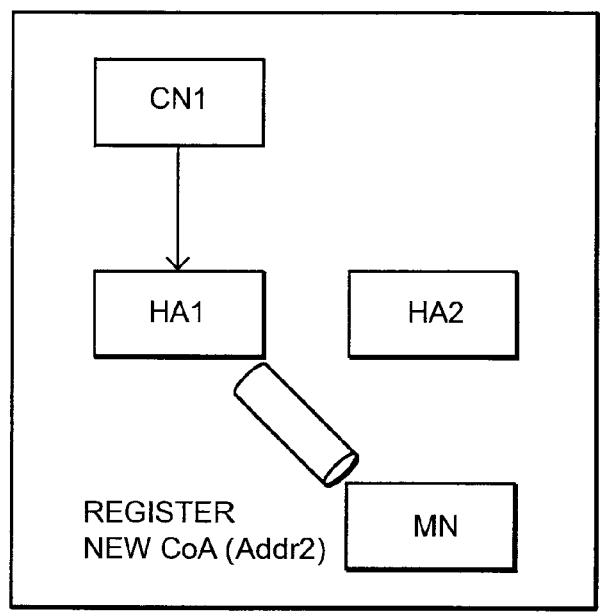
FIG. 19C
PRIOR ART
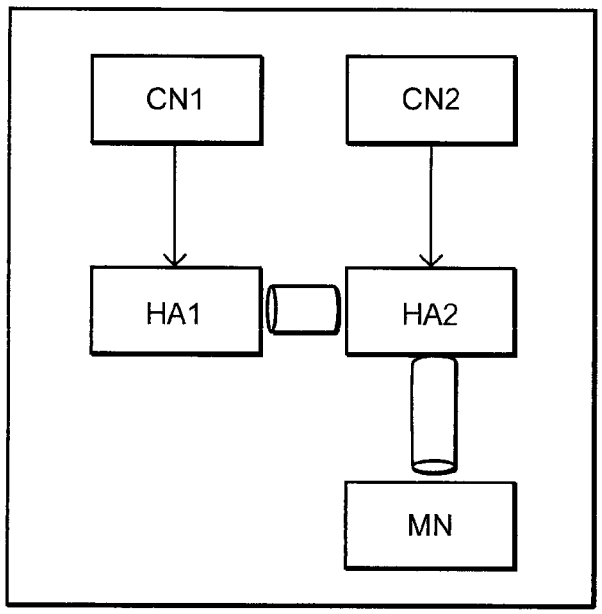

FIG. 19D
PRIOR ART
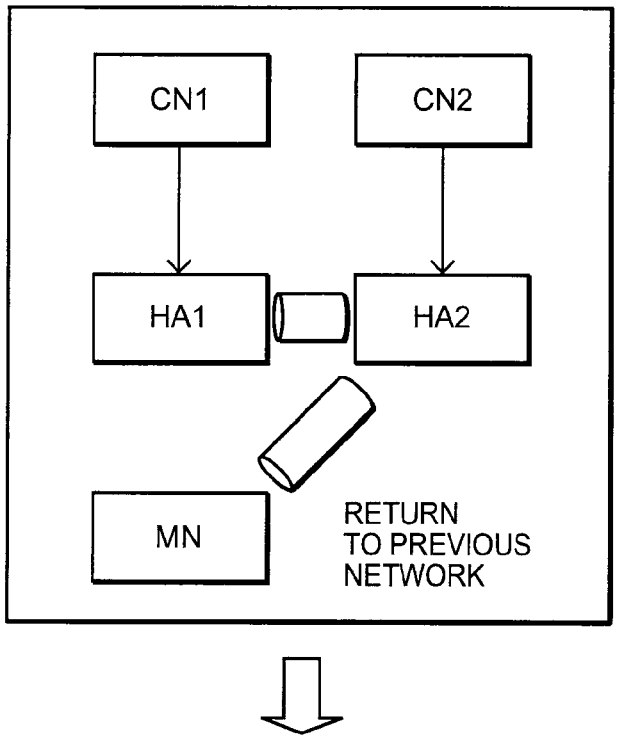
RETURN TO PREVIOUS NETWORK
FIG. 19E
PRIOR ART
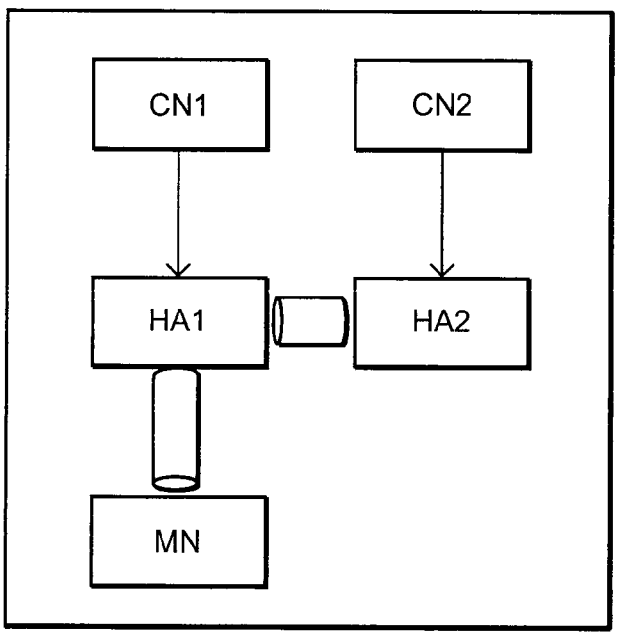

FIG. 20C
PRIOR ART
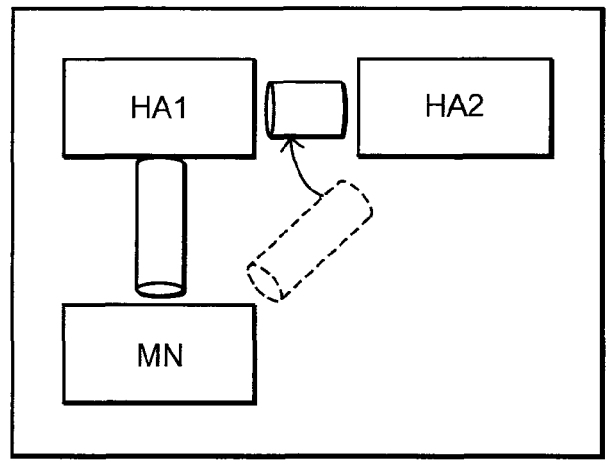
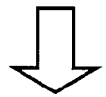
FIG. 20D
PRIOR ART
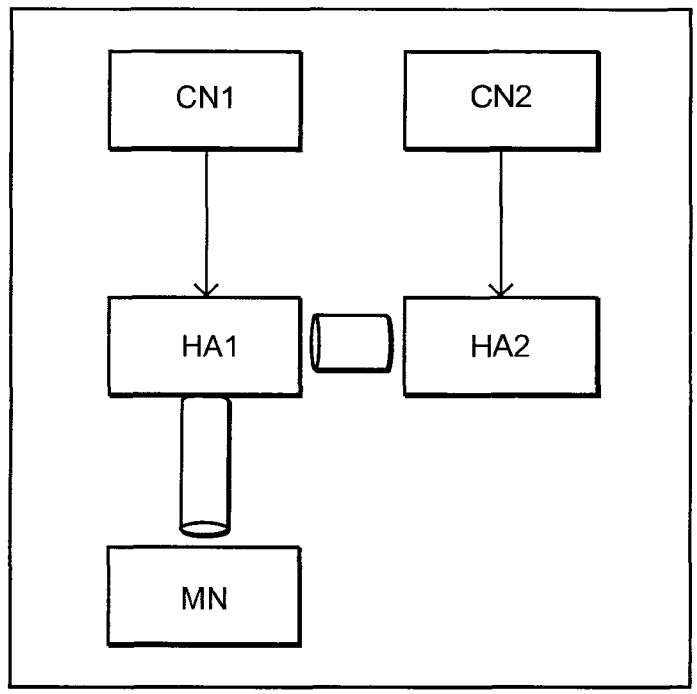

BINDING UPDATE METHOD, MOBILE TERMINAL, HOME AGENT, AND BINDING UPDATE SYSTEM

TECHNICAL FIELD

The present invention relates to a binding update method, a mobile terminal, a home agent, and a binding update system in a communication system for wireless communication using a mobile IP (Mobile Internet Protocol).

BACKGROUND ART

Conventionally, there has been a mobile IP (Mobile Internet Protocol) as a technique in which even if a communication terminal (MN: Mobile Node) has moved, it can continue communication in the same manner before moving. In the mobile IP, the mobile node has a home address (HoA) and a care-of address (CoA). A home agent (HA) forwards a packet addressed to the home address to a care-of address through which the mobile node is communicable at that time so that the mobile node can continue communication using the same address as that before moving. A mobile IP corresponding to IPv6 (IP version 6) is called MIPv6, and its specification is defined by IETF (Internet Engineering Task Force) (see Non-Patent Document 1 below).

The mobile node performs processing (binding update) for notifying the home agent of the care-of address as a forwarding destination of the packet addressed to the home address. The mobile node transmits a BU (Binding Update) message to notify the home agent of the care-of address. The home agent updates a BC (Binding Cache) in which a pair of the home address and the care-of address of the mobile node is registered, and returns a BA (Binding Acknowledgement) message as a reply to the BU message.

Non-Patent Document 1: "Mobility Support in IPv6," RFC3775.

However, in this conventional binding update procedure, there is a case where the binding update cannot be made well. Specifically, the BA message ends up in a loop on a route so that it cannot be delivered to the mobile node.

The case where the binding update cannot be made well will be specifically described in detail with reference to FIG. 14A to FIG. 14D. It is assumed that a MN registers its home address in a HA1 and a HA2. It is also assumed that, as shown in FIG. 14A, the MN registers HoA1=Addr1 and CoA1=Addr2 in the HA1. Therefore, a packet addressed to Addr1 is forwarded to Addr2. Further, it is assumed that the MN registers HoA2=Addr2 and CoA2=Addr3 in the HA2. Thus, the packet addressed to Addr1 is forwarded by the HA1 to Addr2, further forwarded by the HA2 to Addr3, and received by the MN.

Suppose that the MN transmits a BU message to the HA2 at this time to change the CoA from Addr3 to Addr1 as shown in FIG. 14B. In this case, as shown in FIG. 14C, the HA2 updates the BC and transmits a BA message. Since the BA message is transmitted toward the MN, the destination is Addr1. Therefore, the packet addressed to Addr1 is delivered to the HA1, and forwarded by the HA1 to Addr2. Further, since the destination of this packet is Addr2, it is delivered to the HA2 and forwarded by the HA2 to Addr1. Thus, as shown in FIG. 14D, the BA message ends up looping between the HA1 and the HA2. Here, FIG. 15 shows a packet structure when such a situation that a BA message is transferred in a loop between HAs occurs in the BU procedure.

First, a case where a communication partner (CN: Correspondent Node) transmits a packet to Addr1 of the MN as a basic action will be described. The CN transmits a packet with its destination=Addr1 and source=CN. The HA1 receives the transmitted packet, adds a header indicative of being addressed to Addr2, and forwards it to Addr2. The HA2 receives the packet addressed to Addr2, adds a header indicative of being addressed to Addr3, and forwards it to Addr3.

Next, a case where the MN transmits a BU message will be described with reference to FIG. 16. The MN creates a BU message for causing the HA2 to change the CoA to Addr1. In the data part of the BU message, information indicating that the HoA is Addr2 is inserted. The CoA(Addr1) is the source address (Src.) of the BU message. The MN adds, to this BU message, a header indicating that the destination address (Dst.) is the HA1 and the source address is Addr2. When the HA1 receives this encapsulated packet, the HA1 checks the source address of the outer header and the source address of the inner header before removing the outer header. The HA1 has an entry (HoA1=addr1, CoA1=addr2) of the MN in BC. The HA1 checks if the source address of the outer header is CoA1 (=addr2) and if the source address of the inner header is HoA1 (=addr1). If these addresses are correct, the HA1 removes the outer header and transmits the inner packet to HA2. In this case, the inner packet includes the BU message as data.

Further, the MN adds, to the above-mentioned encapsulated BU message addressed to the HA1, a header indicating that the destination address is to the HA2 and the source address is Addr3. When the HA2 receives this encapsulated packet, the HA2 checks the source address of the outer header and the source address of the inner header before removing the outer header. The HA2 has an entry (HoA2=addr2, CoA2=addr3) of the MN in BC. The HA2 checks if the source address of the outer header is CoA2 (=addr3) and if the source address of the inner header is HoA2 (=addr2). If these addresses are correct, the HA2 removes the outer header and transmits the inner packet to HA1. In this case, the inner packet includes the encapsurated packet that includes the BU message as data.

In other words, the MN creates a BU message addressed to the HA2, encapsulates it in such a manner that the BU message passes through the HA1, further creates a packet encapsulated in such a manner that the encapsulated packet passes through the HA2, and transmits the created packet to the HA2. The outer header is removed from the packet by the HA2 and transmitted to the HA1. Further, the outer header is removed by the HA1 so that the BU message is decapsulated and transmitted to the HA2. The HA2 receives this BU message, updates the BC, and transmits a BA message.

Here, the BA message has a packet structure as shown in FIG. 17. The HA2 creates and transmits a BA message addressed to Addr1 as a new CoA of the MN. The packet addressed to Addr1 is delivered to the HA1, and the HA1 forwards it with additional header in which the destination address is Addr2 according to the BC. The packet addressed to Addr2 is delivered to the HA2, and the HA2 forwards it with additional header in which the destination address is Addr1 in the same manner according to the BC. Thus, the BA message transmitted by the HA2 ends up looping between the HA1 and the HA2. As mentioned above, in the binding update procedure for the conventional mobile IP, when a binding is to be updated, there is a case where the binding update cannot be made correctly. Therefore, there is a problem that the BA message as a reply message is forwarded endlessly between the HAs and hence it can never be delivered to the MN. Note that, although the above described the case where the number of HAs is two, the same situation can occur when the number of HAs is three or more. For example, such a case is shown in FIG. 18.

Here, a situation as shown in FIG. 19A to FIG. 19E is considered as the case where the number of HAs is two and the MN transmits the above-mentioned BU message. As shown in FIG. 19A, it is assumed that the MN is communicating with a CN1 using Addr1. Then, as shown in FIG. 19B, it is assumed that the MN moves to another network and gets a new address Addr2. The MN transmits the BU message to the HA1, having the HA1 forward a packet addressed to Addr1 (HoA) to Addr2 (CoA). Next, as shown in FIG. 19C, it is assumed that the MN initiates communication with a CN2 using Addr2, and then, it further moves and gets a new address Addr3. The MN transmits the BU message to the HA2 to that the HA2 forward a packet addressed to Addr2 (HoA) to Addr3 (CoA).

Here, as shown in FIG. 19D, it is assumed that this MN has returned to the initial (previous) network. Then, as shown in FIG. 19E, it is assumed that the MN makes changes to return a packet from the CN1 so as to receive the packet via the HA1, and to forward, to the HA1, a packet from the CN2 after being forwarded to the HA2 so as to receive the packet via the HA1. At this time, there are two ways depending on which of bindings, a binding of the HA1 or a binding of the HA2, should be changed first.

As shown in FIG. 20B (indicating one state after FIG. 20A) to FIG. 20D, if a way to update the binding of the HA1 first and the binding of the HA2 next is performed, they can be changed to desired binding states. However, as shown in FIG. 20E (indicating the other state after FIG. 20A), if the binding of the HA2 has been updated first, the total binding is not updated correctly as described above, resulting in a situation where the BA message is forwarded in a loop between the HAs and cannot be delivered to the MN. Thus, it can be said that the problem to be solved by the present invention can arise under a certain condition.

DISCLOSURE OF THE INVENTION

The present invention has been made in view of the above problem, and it is an object thereof to provide a binding update method, a mobile terminal, a home agent, and a binding update system, capable of resolving such a situation that a BA message is forwarded in a loop between HAs.

In order to achieve the above object, according to the present invention, there is provided a binding update method, in which a mobile terminal transmits, to a home agent of the mobile terminal, a first message containing an address that is the destination to that the home agent forwards, and the home agent of the mobile terminal updates, based on the first message, a cache in which a home address of the mobile terminal is associated with an address that is the destination to that the home agent forwards, and transmits a second message as a reply to the first message to the mobile terminal, the binding update method being such that when receiving the second message, the mobile terminal transmits, to the home agent of the mobile terminal, a third message notifying that the second message has been received, and after receiving the third message, the home agent of the mobile terminal updates the cache. This configuration can resolve such a situation that a BA message keeps reciprocating between HAs and cannot be delivered to an MN. Note that the first message corresponds to a BU message, the second message corresponds to the BA message, and the third message corresponds to a BAR (Binding Acknowledgement Reply) message to be described later.

It is a preferred embodiment of the present invention that, in the binding update method of the present invention, the home agent of the mobile terminal sets, in the cache, a change-in-progress flag indicating that a received message is not forwarded during updating of the cache based on the first message, the home agent of the mobile terminal does not forward the received message while the change-in-progress flag is set. This configuration can prevent the BA message from keeping reciprocating between HAs.

It is another preferred embodiment of the present invention that, in the binding update method of the present invention, the home agent of the mobile terminal adds identification information (corresponding to cookie information to be described later) to the second message, and the mobile terminal adds, to the third message, the identification information added to the second message. This configuration enables transmission of the BAR message after waiting for receiving of the BA message without fail.

According to the present invention, there is also provided a binding update method, in which a mobile terminal transmits, to a home agent of the mobile terminal, a first message containing an address that is the destination to that the home agent forwards, and the home agent of the mobile terminal updates, based on the first message, a cache in which a home address of the mobile terminal is associated with an address that is the destination to that the home agent forwards, and transmits a second message as a reply to the first message to the mobile terminal, the binding update method being such that the home agent of the mobile terminal sets, in the cache, a change-in-progress flag indicating that a received message is not forwarded during updating of the cache based on the first message, the home agent of the mobile terminal does not forward the received message while the change-in-progress flag is set. This configuration can resolve such a situation that the BA message keeps reciprocating between HAs.

Further, according to the present invention, there is provided a mobile terminal used in a binding update method, in which the mobile terminal transmits, to a home agent of the mobile terminal, a first message containing an address that is the destination to that the home agent forwards, and the home agent of the mobile terminal updates, based on the first message, a cache in which a home address of the mobile terminal is associated with an address that is the destination to that the home agent forwards, and transmits a second message as a reply to the first message to the mobile terminal, the mobile terminal including receiving means for receiving the second message, message generating means for generating a third message notifying that the second message has been received when the receiving means has received the second message, and transmission means for transmitting the generated third message to the home agent of the mobile terminal. This configuration can resolve such a situation that the BA message keeps reciprocating between HAs and cannot be delivered to an MN.

It is a preferred embodiment of the present invention that, in the mobile terminal of the present invention, when identification information is added to the second message, the message generating means adds, to the third message, the identification information added to the second message. This configuration enables transmission of the BAR message after waiting for receiving of the BA message without fail.

Further, according to the present invention, there is provided a home agent of a mobile terminal used in a binding update method, in which the mobile terminal transmits, to the home agent of the mobile terminal, a first message containing an address that is the destination to that the home agent forwards, and the home agent of the mobile terminal updates, based on the first message, a cache in which a home address of the mobile terminal is associated with an address that is the destination to that the home agent forwards, and transmits a second message as a reply to the first message to the mobile terminal, the home agent including message generating means for generating the second message, transmission means for transmitting the generated second message to the mobile terminal, receiving means for receiving, from the mobile terminal, a third message notifying that the second message has been received, and update means for updating the cache when the third message has been received by the receiving means. This configuration can resolve such a situation that the BA message keeps reciprocating between HAs, and cannot be delivered to an MN.

It is a preferred embodiment of the present invention that, in the home agent of the present invention, the update means sets, in the cache, a change-in-progress flag indicating that a received message is not forwarded during updating of the cache based on the first message, and the transmission means does not forward the message while the change-in-progress flag is set. This configuration can prevent the BA message from keeping reciprocating between HAs.

It is another preferred embodiment of the present invention that, in the home agent of the present invention, the message generating means adds identification information to the second message. This configuration enables transmission of the BA message after waiting for receiving of the BA message without fail.

Further, according to the present invention, there is provided a home agent of a mobile used in a binding update method, in which the mobile terminal transmits, to the home agent of the mobile terminal, a first message containing an address that is the destination to that the home agent forwards, and the home agent of the mobile terminal updates, based on the first message, a cache in which a home address of the mobile terminal is associated with an address that is the destination to that the home agent forwards, and transmits a second message as a reply to the first message to the mobile terminal, the home agent including update means for setting, in the cache, a change-in-progress flag indicating that a received message is not forwarded during updating of the cache based on the first message, and transmission means for not forwarding the received message while the change-in-progress flag is set. This configuration can resolve such a situation that the BA message keeps reciprocating between HAs.

Further, according to the present invention, there is provided a binding update system, in which a mobile terminal transmits, to a home agent of the mobile terminal, a first message containing an address that is the destination to that the home agent forwards, and the home agent of the mobile terminal updates, based on the first message, a cache in which a home address of the mobile terminal is associated with an address that is the destination to that the home agent forwards, and transmits a second message as a reply to the first message to the mobile terminal, the binding update system being such that when receiving the second message, the mobile terminal transmits, to the home agent of the mobile terminal, a third message notifying that the second message has been received, and after receiving the third message, the home agent of the mobile terminal updates the cache. This configuration can resolve such a situation that the BA message keeps reciprocating between HAs and cannot be delivered to an MN.

It is a preferred embodiment of the present invention that, in the binding update system of the present invention, the home agent of the mobile terminal sets, in the cache, a change-in-progress flag indicating that a received message is not forwarded during updating of the cache based on the first message, the home agent of the mobile terminal does not forward the received message while the change-in-progress flag is set. This configuration can prevent the BA message from keeping reciprocating between HAs.

It is another preferred embodiment of the present invention that, in the binding update system of the present invention, the home agent of the mobile terminal adds identification information to the second message, and the mobile terminal adds, to the third message, the identification information added to the second message. This configuration enables transmission of the BAR message after waiting for receiving of the BA message without fail.

Further, according to the present invention, there is provided a binding update system, in which a mobile terminal transmits, to a home agent of the mobile terminal, a first message containing an address that is the destination to that the home agent forwards, and the home agent of the mobile terminal updates, based on the first message, a cache in which a home address of the mobile terminal is associated with an address that is the destination to that the home agent forwards, and transmits a second message as a reply to the first message to the mobile terminal, the binding update system being such that the home agent of the mobile terminal sets, in the cache, a change-in-progress flag indicating that a received message is not forwarded during updating of the cache based on the first message, the home agent of the mobile terminal does not forward the received message while the change-in-progress flag is set. This configuration can resolve such a situation that the BA message keeps reciprocating between HAs.

According to the present invention, the binding update method, the mobile terminal, the home agent, and the binding update system have the above-mentioned configurations, so that such a situation that the BA message is forwarded in a loop between HAs can be resolved.

BRIEF DESCRIPTION OF THE DRAWINGS

FIG. 1A It is a diagram for explaining part of an example of a series of binding updates according to an embodiment of the present invention.

FIG. 1B It is a diagram showing a state after FIG. 1A of the example of the series of binding updates according to the embodiment of the present invention.

FIG. 1C It is a diagram showing a state after FIG. 1B of the example of the series of binding updates according to the embodiment of the present invention.

FIG. 1D It is a diagram showing a state after FIG. 1C of the example of the series of binding updates according to the embodiment of the present invention.

FIG. 2B It is a diagram for explaining a state after FIG. 2A of the other example of the series of binding updates according to the embodiment of the present invention.

FIG. 2C It is a diagram for explaining a state after FIG. 2B of the other example of the series of binding updates according to the embodiment of the present invention.

FIG. 4 It is a diagram showing an example of a sequence of messages for a new binding update according to the embodiment of the present invention.

FIG. 5A It is a table showing part of an example of transition of a BC of an HA according to the embodiment of the present invention.

FIG. 5B It is a table showing a state after FIG. 5A in the example of transition of the BC of the HA according to the embodiment of the present invention.

FIG. 5C It is a table showing a state after FIG. 5B in the example of transition of the BC of the HA according to the embodiment of the present invention.

FIG. 6 It is a diagram showing an example of the format of a BAR message according to the embodiment of the present invention.

FIG. 19B It is a diagram showing a state after FIG. 19A in the situation in which the number of HAs is two and the MN transmits the BU message in the conventional binding update.

FIG. 19C It is a diagram showing a state after FIG. 19B in the situation in which the number of HAs is two and the MN transmits the BU message in the conventional binding update.

FIG. 19D It is a diagram showing a state after FIG. 19C in the situation in which the number of HAs is two and the MN transmits the BU message in the conventional binding update.

FIG. 19E It is a diagram showing a state after FIG. 19D in the situation in which the number of HAs is two and the MN transmits the BU message in the conventional binding update.

FIG. 20C It is a diagram showing a state after FIG. 20B in one of the two ways to perform the binding of the HA1 and the binding of the HA2 in the conventional binding update.

FIG. 20D It is a diagram showing a state after FIG. 20C in one of the two ways to perform the binding of the HA1 and the binding of the HA2 in the conventional binding update.

BEST MODE FOR CARRYING OUT THE INVENTION

Figure 3:
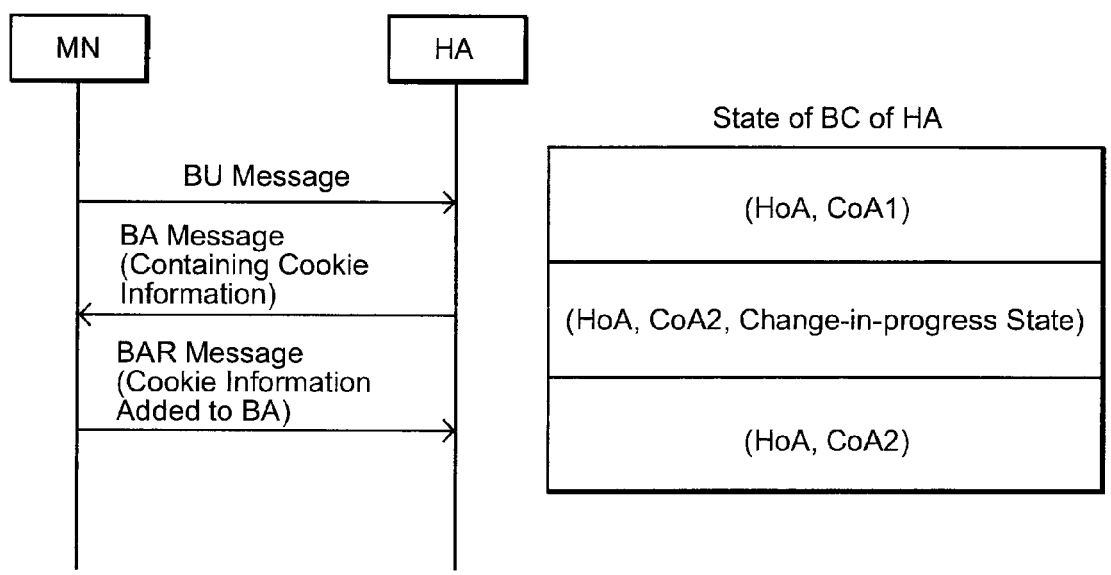
FIG. 3 It is a diagram for explaining a solution based on three points according to the embodiment of the present invention.

An embodiment of the present invention will now be described with reference to FIG. 1 to FIG. 13. FIG. 1A to FIG. 1E are diagrams for explaining an example of a series of binding updates according to the embodiment of the present invention. FIG. 2A to FIG. 2D are diagrams for explaining another example of a series of binding updates according to the embodiment of the present invention. FIG. 3 is a diagram for explaining a solution based on three points according to the embodiment of the present invention. FIG. 4 is a diagram showing an example of a sequence of messages for a new binding update method according to the embodiment of the present invention. FIG. 5A to FIG. 5C are tables showing an example of transition of a BC of an HA according to the embodiment of the present invention. FIG. 6 is a diagram showing an example of the format of a BAR message according to the embodiment of the present invention.

Figure 7:
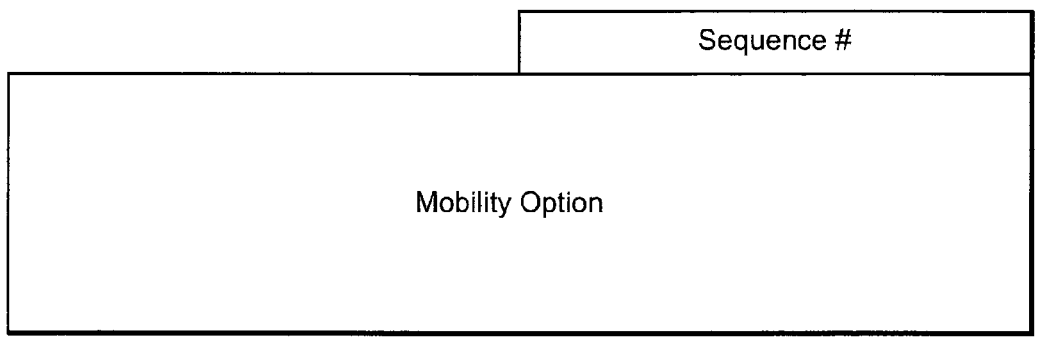
FIG. 7 It is a diagram showing an example of the format of message data of the BAR message according to the embodiment of the present invention.
Figure 8:
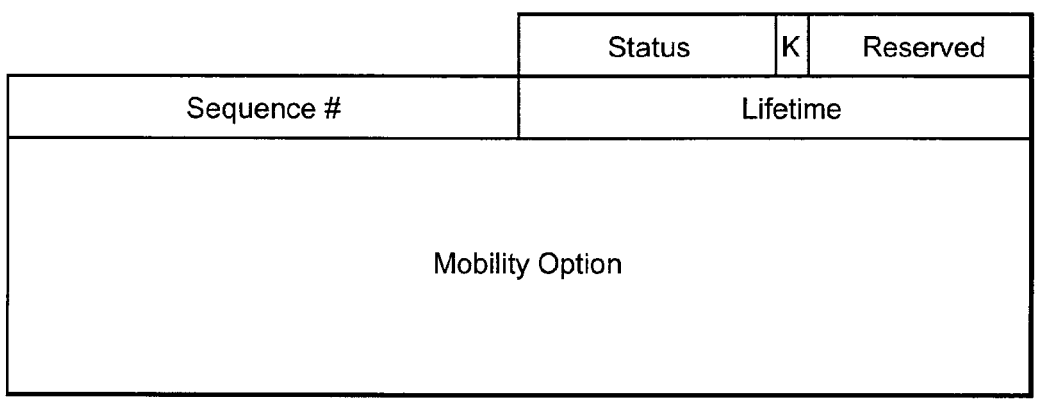
FIG. 8 It is a diagram showing an example of the format of a BA message according to the embodiment of the present invention.
Figure 9:
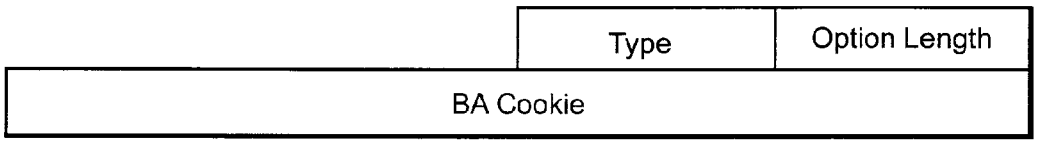
FIG. 9 It is a diagram showing an example of the format of mobility option according to the embodiment of the present invention.
Figure 10:
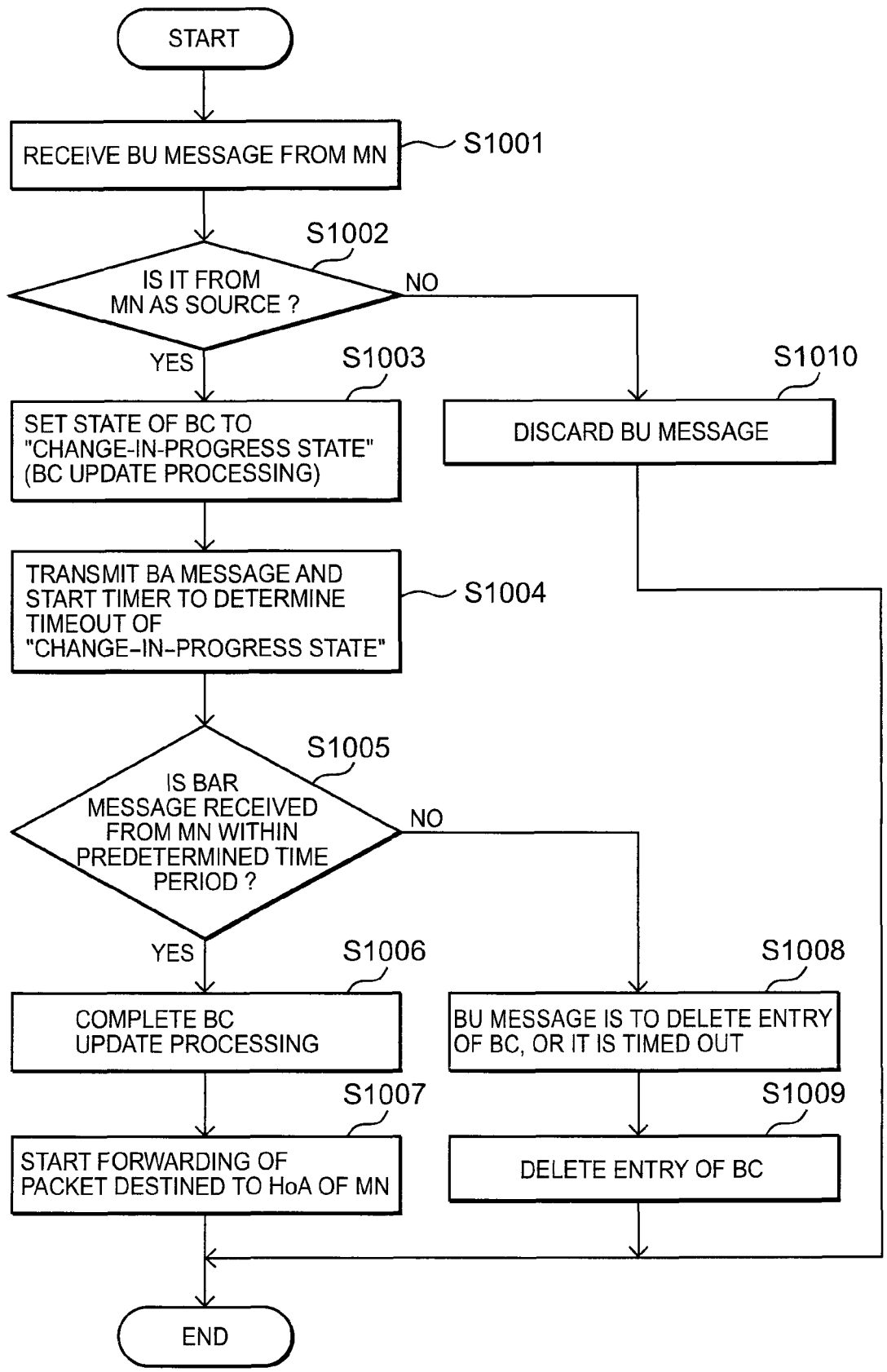
FIG. 10 It is a flowchart for explaining an example of binding update processing by an HA according to the embodiment of the present invention.
Figure 11:
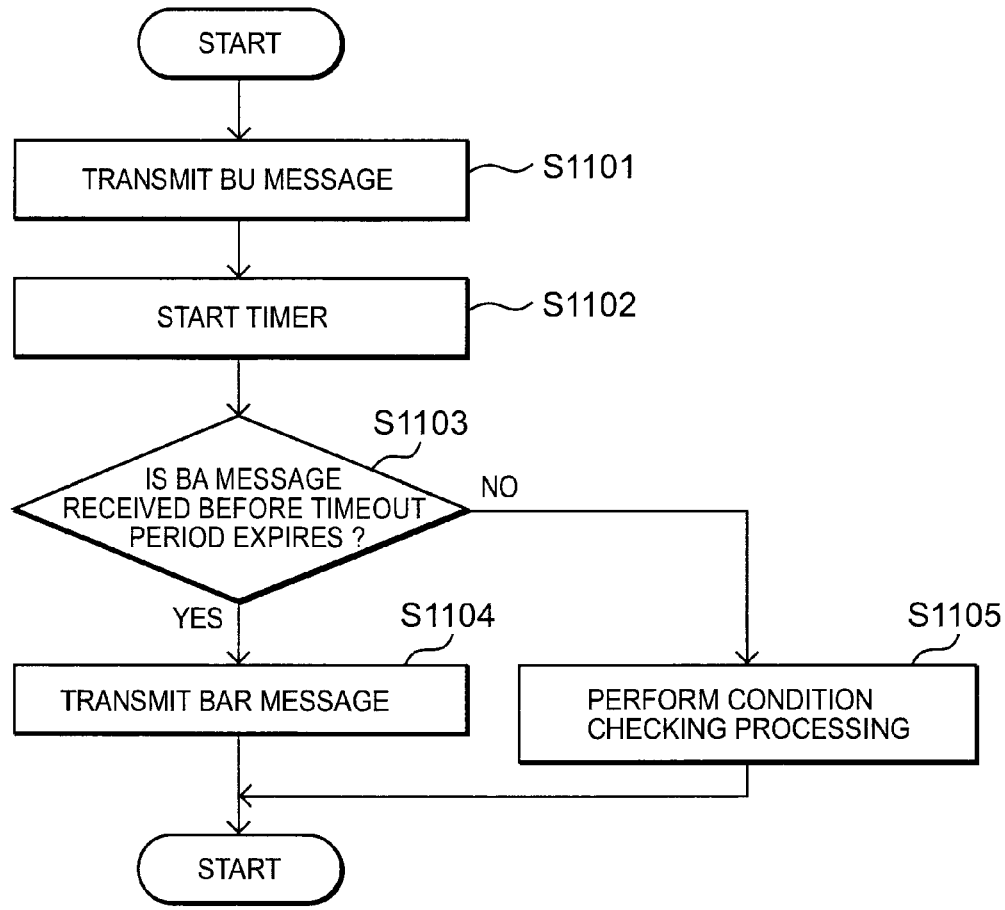
FIG. 11 It is a flowchart for explaining an example of binding update processing by an MN according to the embodiment of the present invention.
Figure 12:
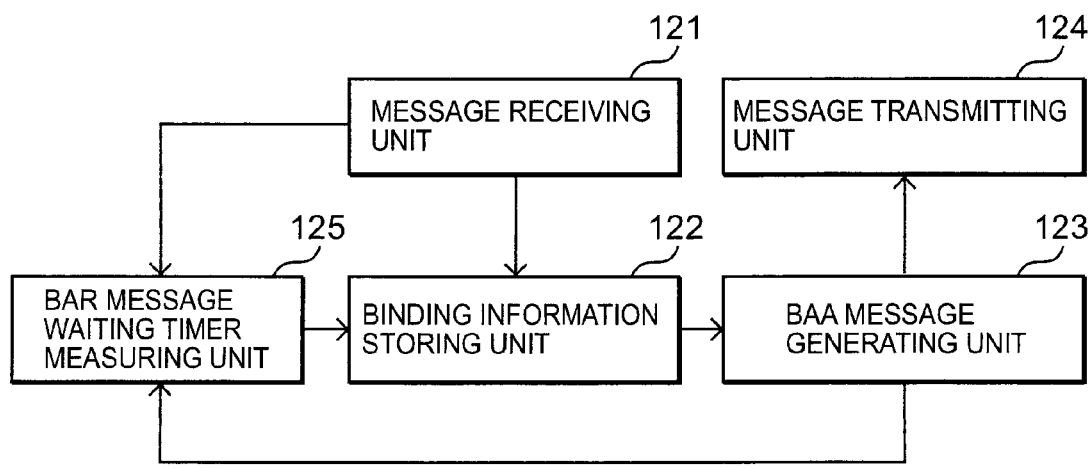
FIG. 12 It is a block diagram showing an example of a configuration of the HA according to the embodiment of the present invention.
Figure 13:
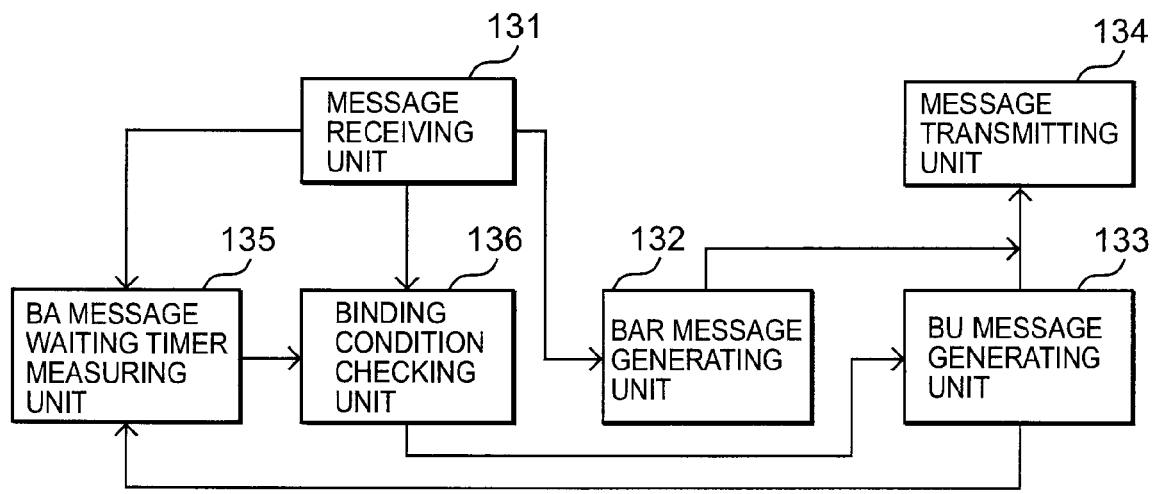
FIG. 13 It is a block diagram showing an example of a configuration of the MN according to the embodiment of the present invention.
Figure 14A:
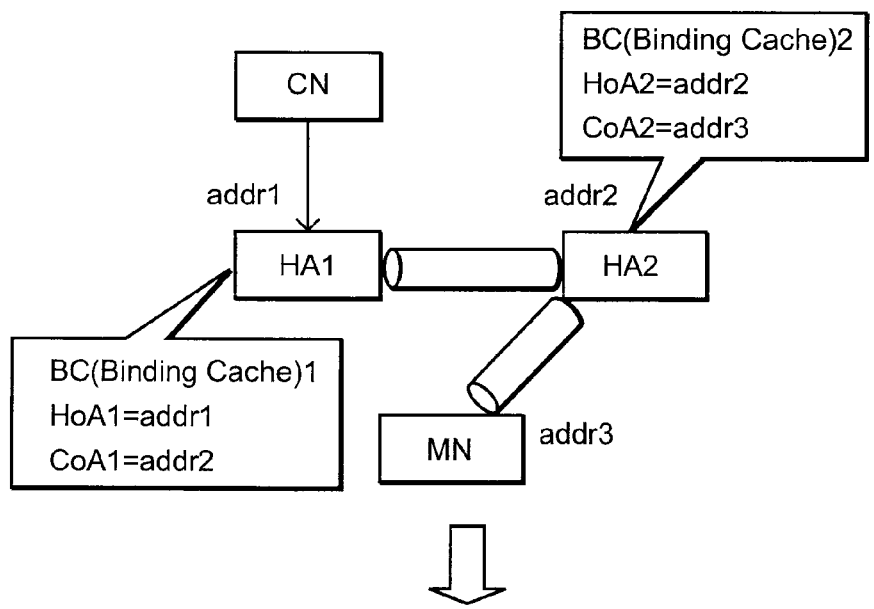
FIG. 14A It is a diagram for explaining part of an example in which a loop occurs in a conventional binding update.
Figure 14B:
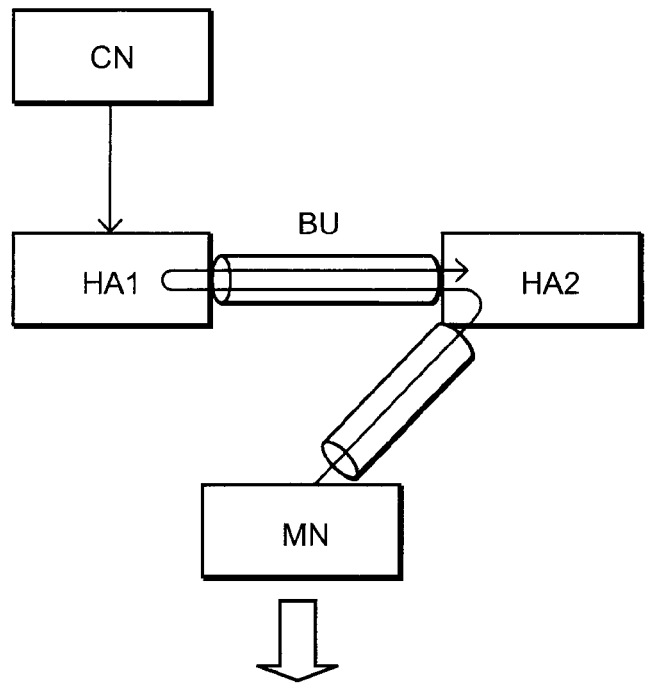
FIG. 14B It is a diagram showing a state after FIG. 14A in the example in which the loop occurs in the conventional binding update.
Figure 14C:
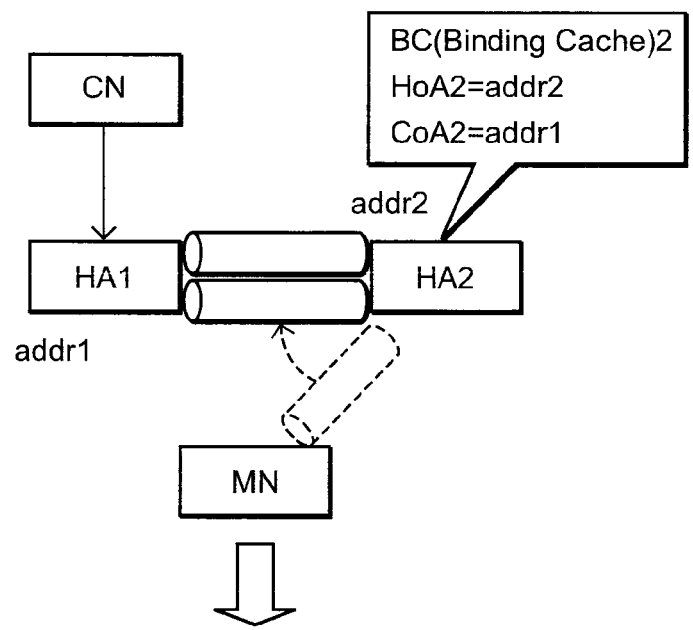
FIG. 14C It is a diagram showing a state after FIG. 14B in the example in which the loop occurs in the conventional binding update.
Figure 14D:
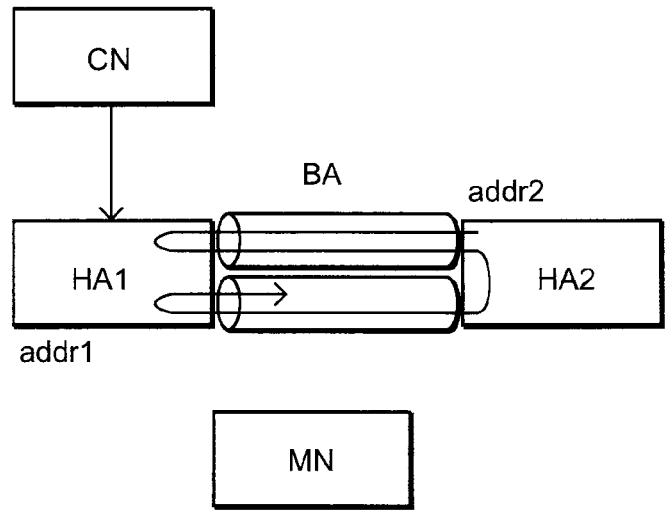
FIG. 14D It is a diagram showing a state after FIG. 14C in the example in which the loop occurs in the conventional binding update.
Figure 15:
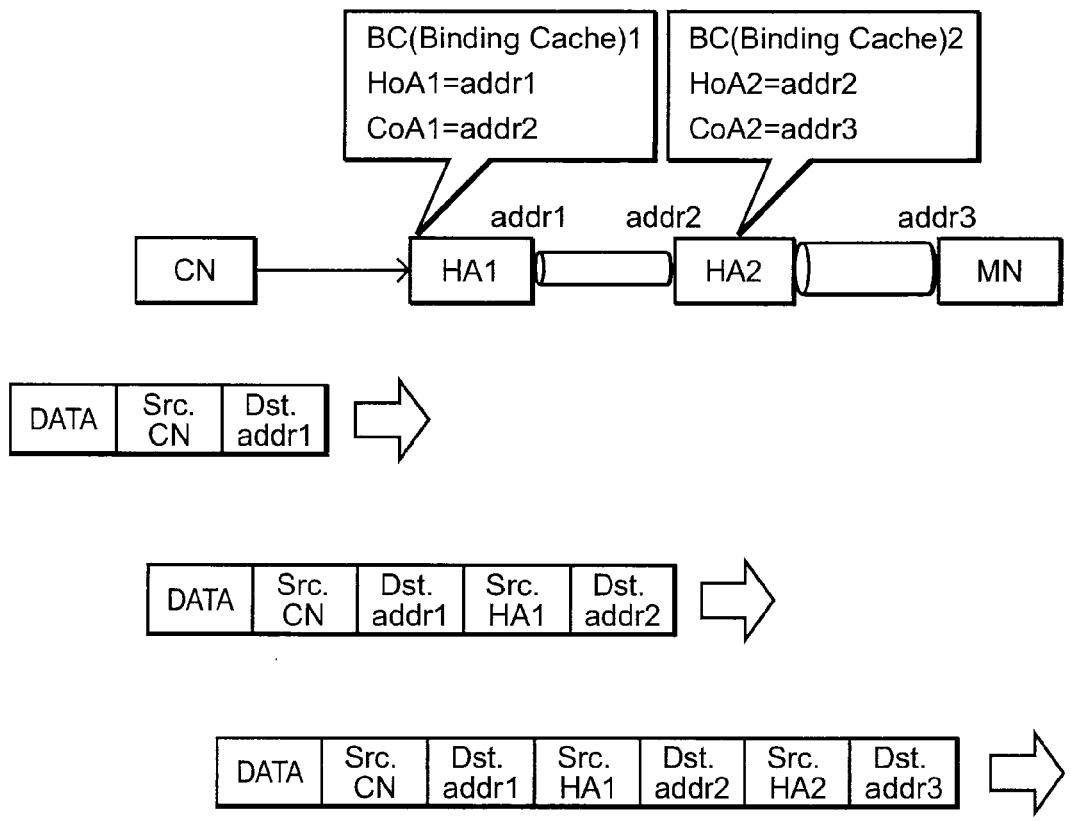
FIG. 15 It is a diagram showing an example of a packet structure when such a situation that a BA message reciprocates between HAs occurs in a conventional BU procedure.
Figure 16:
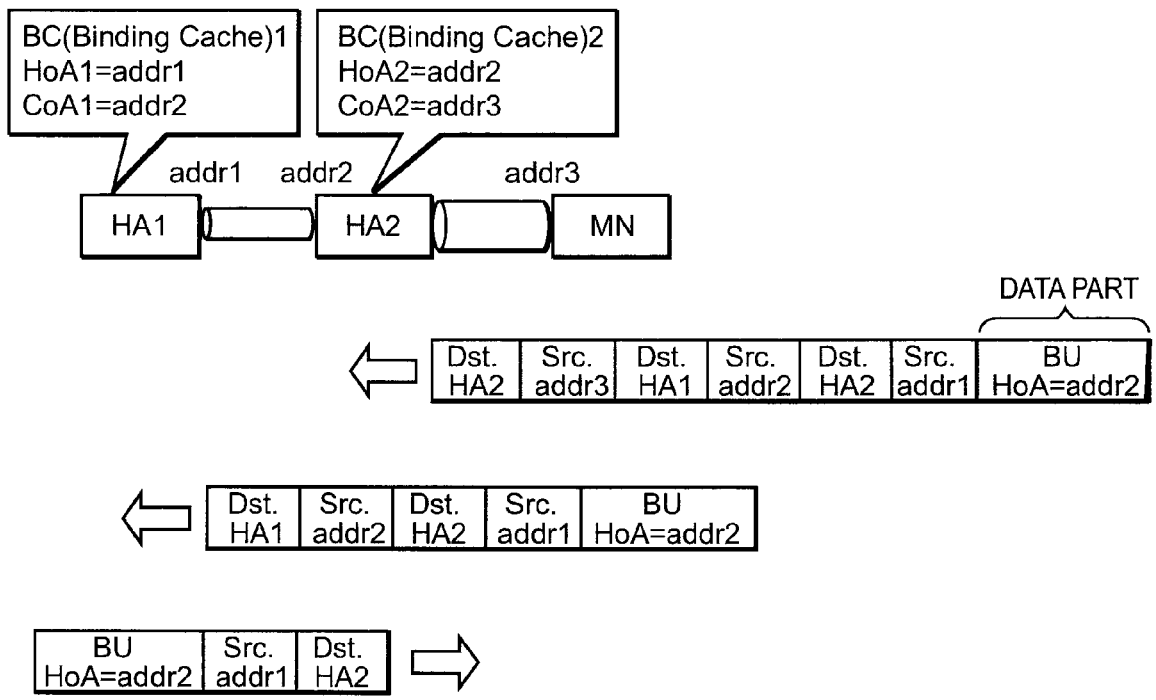
FIG. 16 It is a diagram for explaining a case where the MN transmits a BU message in the conventional binding update.
Figure 17:
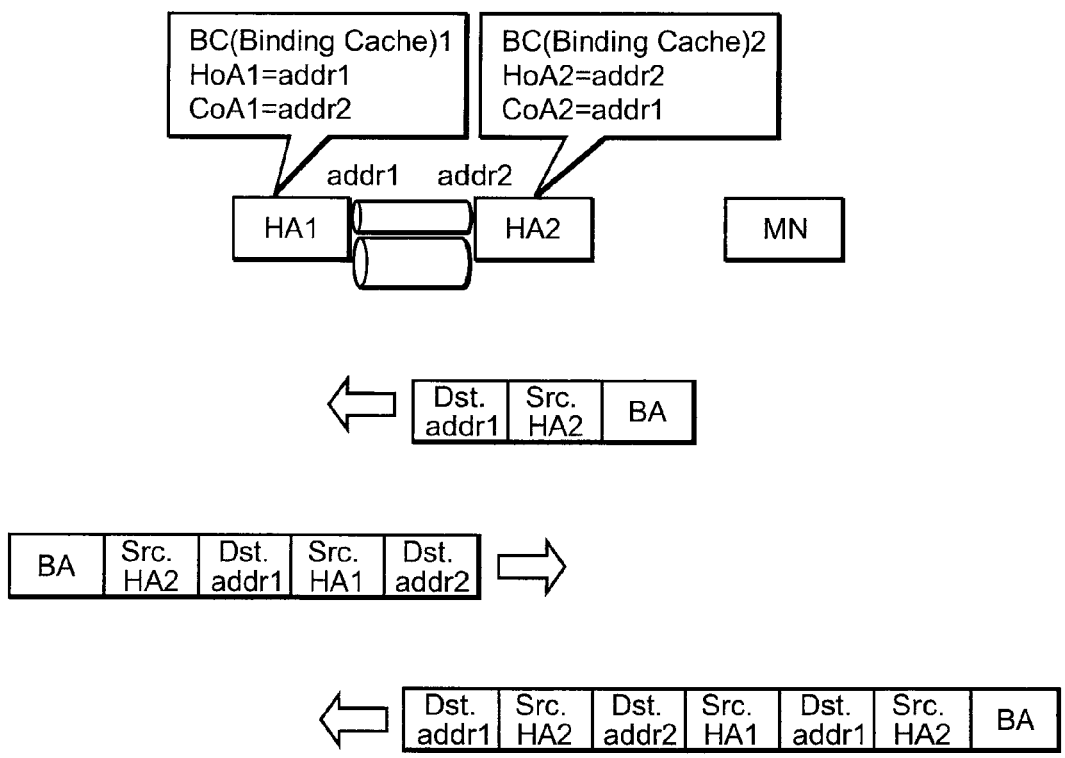
FIG. 17 It is a diagram showing an example of a packet configuration of the BA message in the conventional binding update.
Figure 18:
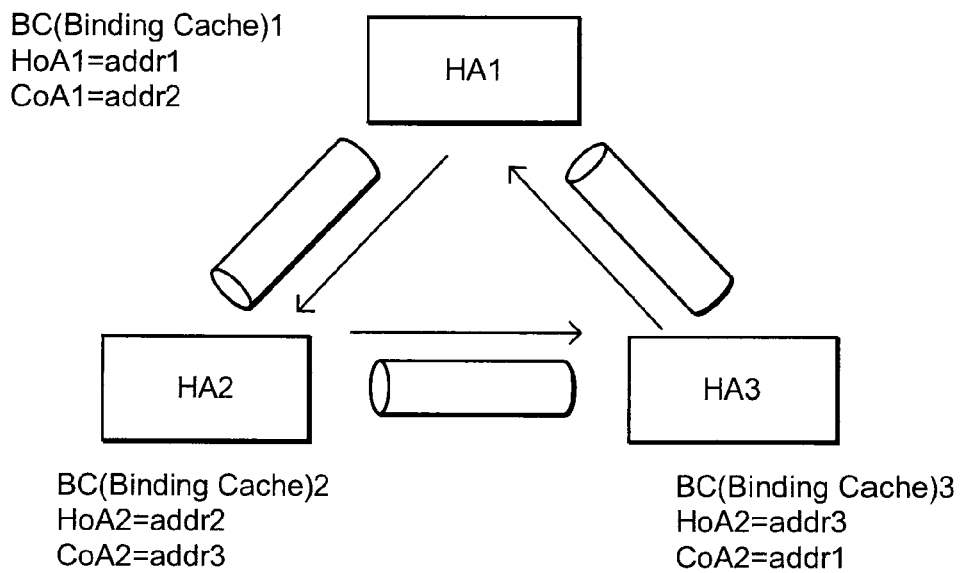
FIG. 18 It is a diagram showing a case where three HAs exist in the conventional binding update.
Figure 19A:
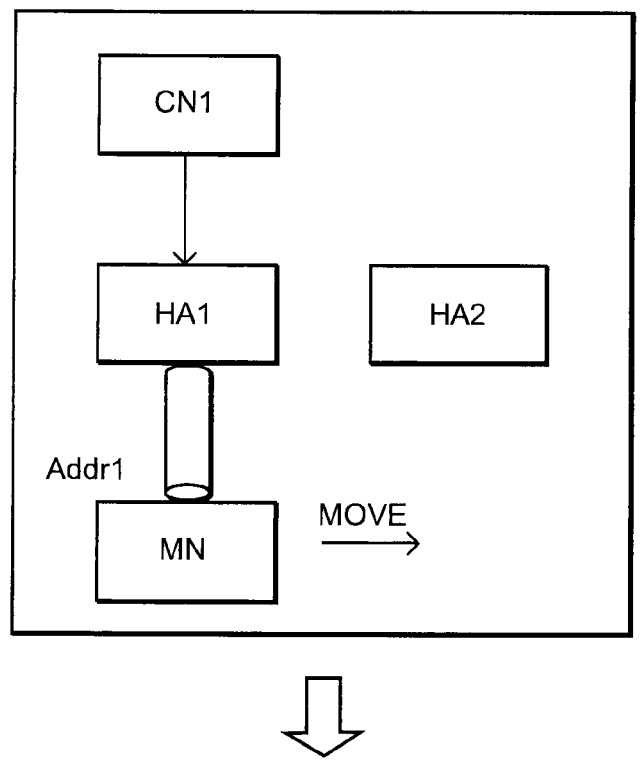
FIG. 19A It is a diagram for explaining part of a situation in which the number of HAs is two and the MN transmits the BU message in the conventional binding update.
Figure 20A:
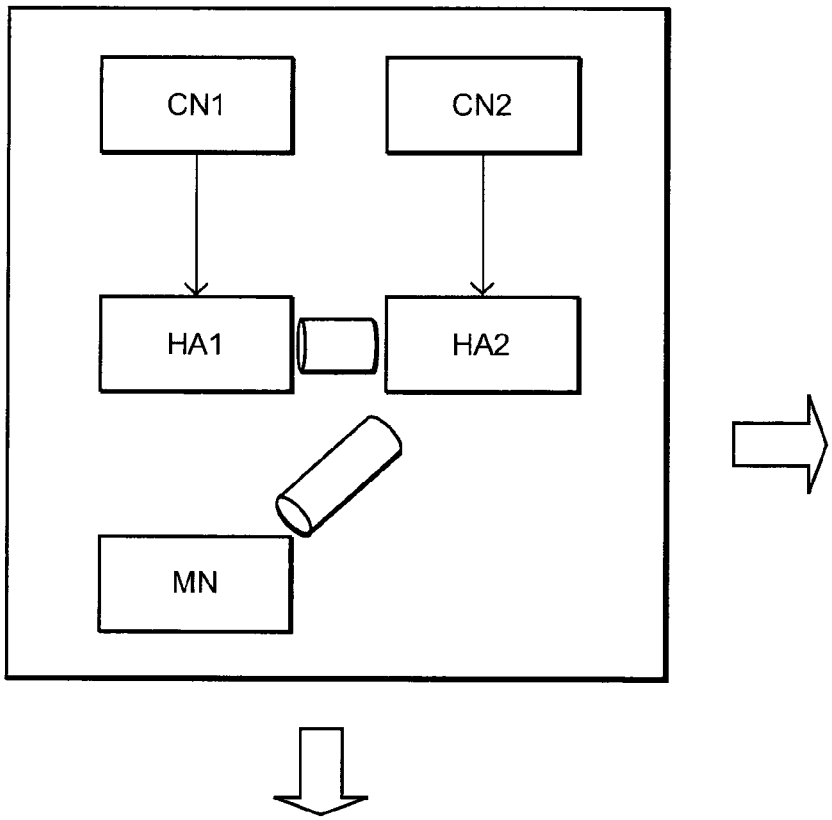
FIG. 20A It is a diagram for explaining part of two ways to perform a binding of an HA1 and a binding of an HA2 in the conventional binding update.
Figure 20B:
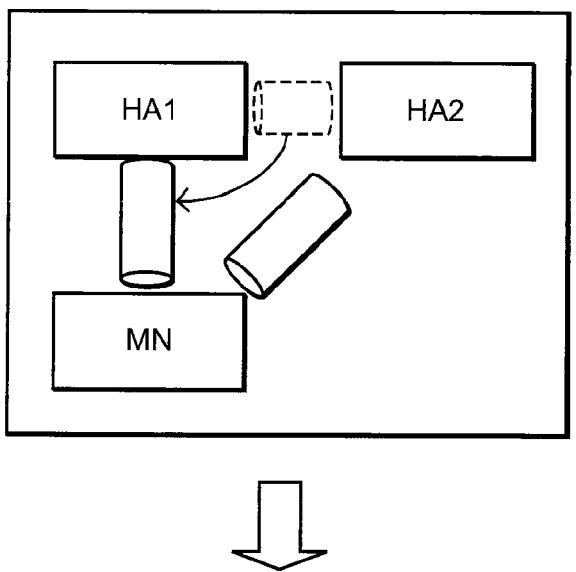
FIG. 20B It is a diagram showing a state after FIG. 20A in one of the two ways to perform the binding of the HA1 and the binding of the HA2 in the conventional binding update.
Figure 20E:
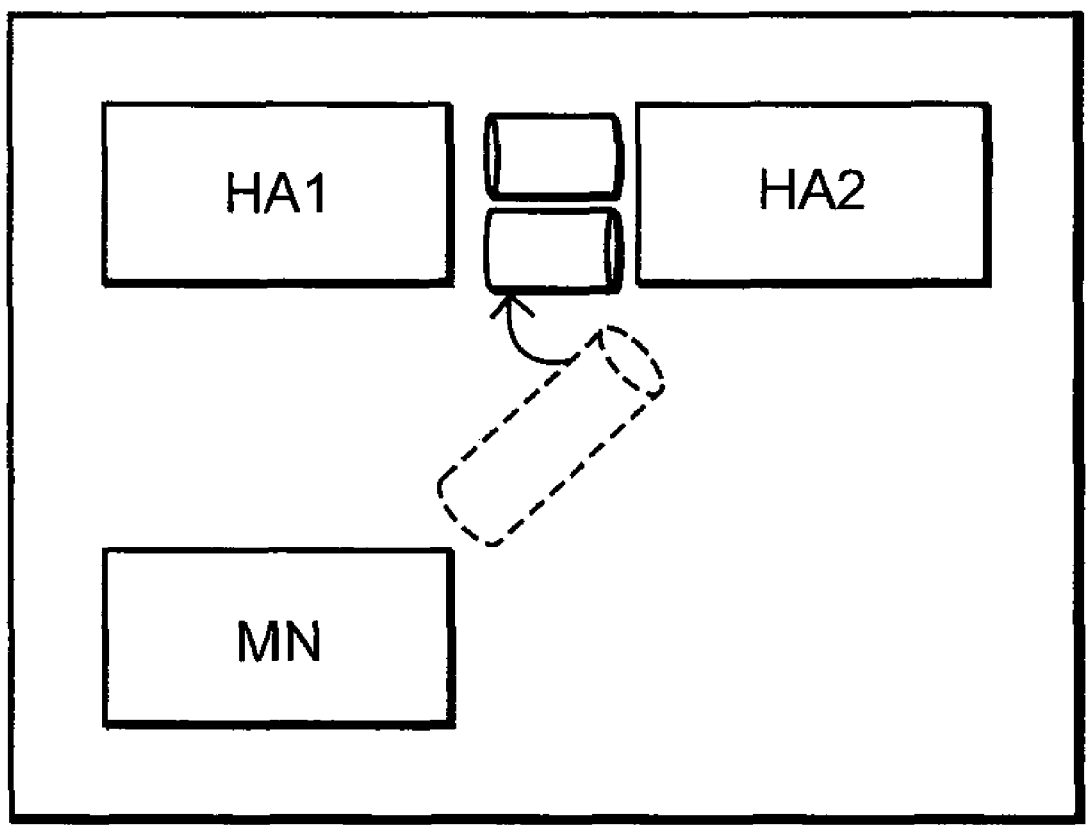
FIG. 20E It is a diagram showing a state after FIG. 20A in the other of the two ways to perform the binding of the HA1 and the binding of the HA2 in the conventional binding update.

FIG. 7 is a diagram showing an example of the format of message data of the BAR message according to the embodiment of the present invention. FIG. 8 is a diagram showing an example of the format of a BA message according to the embodiment of the present invention. FIG. 9 is a diagram showing an example of the format of mobility option according to the embodiment of the present invention. FIG. 10 is a flowchart for explaining an example of binding update processing by an HA according to the embodiment of the present invention. FIG. 11 is a flowchart for explaining an example of binding update processing by an MN according to the embodiment of the present invention. FIG. 12 is a block diagram showing an example of a configuration of the HA according to the embodiment of the present invention. FIG. 13 is a block diagram showing an example of a configuration of the MN according to the embodiment of the present invention.

In order to solve the problem, a method of adding a BAR message to confirm that a BA message has been delivered will be described with reference to FIG. 1A to FIG. 1E. As shown in FIG. 1A to FIG. 1D, an HA2 doesn't perform any binding update requested by a BU until receiving the BAR message.

This prevents the BA message from making a loop between an HA1 and the HA2, so that the BA message is delivered to an MN. As shown in FIG. 1D, the MN receives the BA message and returns the BAR message as a reply. Like a BU message, this BAR message is delivered to the HA2 via the HA1.

Figure 1E:
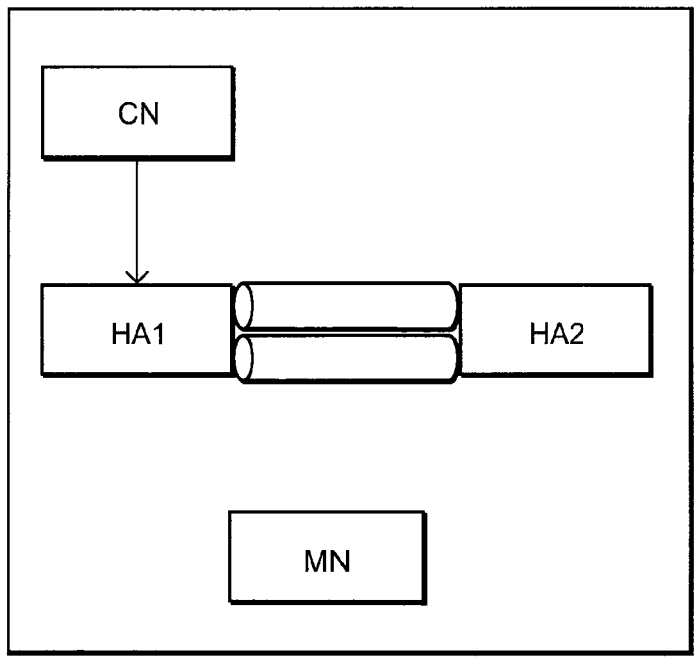
FIG. 1E It is a diagram showing a state after FIG. 1D of the example of the series of binding updates according to the embodiment of the present invention.
Figure 2A:
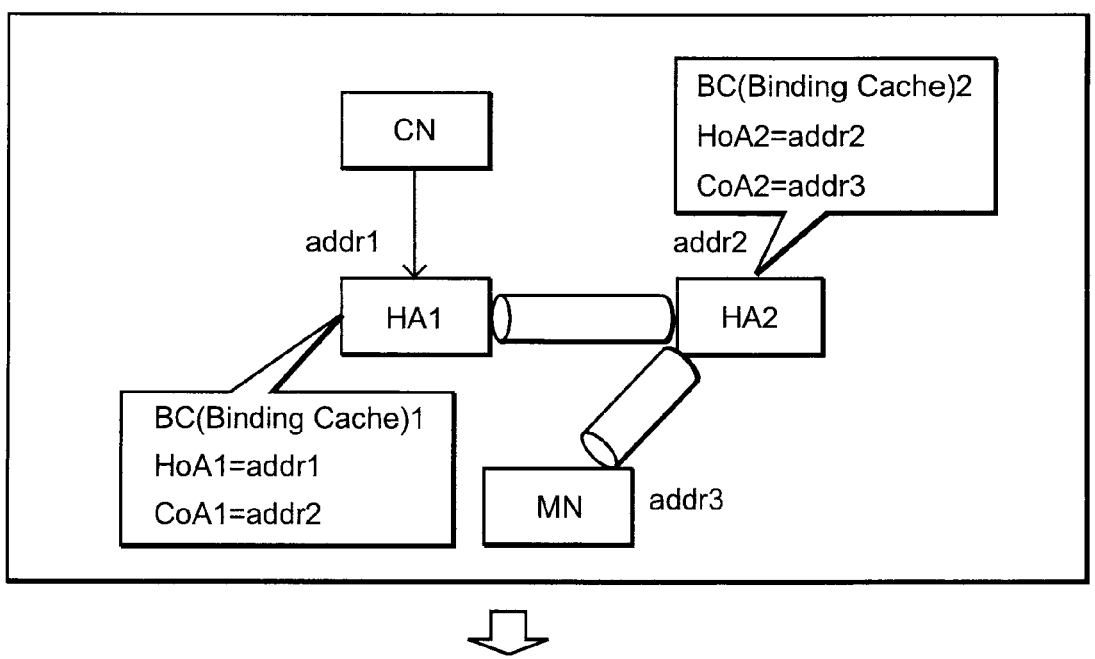
FIG. 2A It is a diagram for explaining part of another example of a series of binding updates according to the embodiment of the present invention.
Figure 2D:
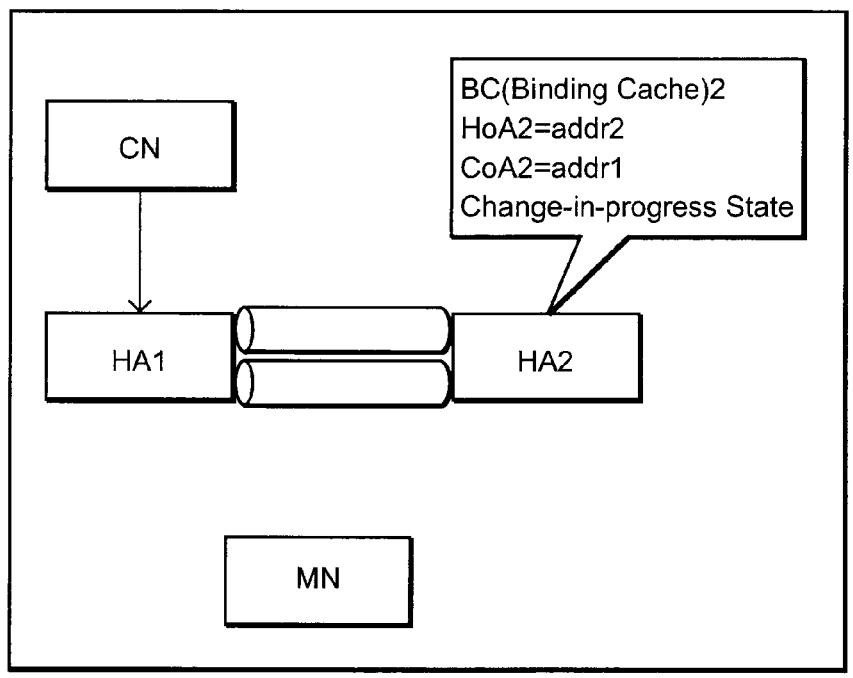
FIG. 2D It is a diagram for explaining a state after FIG. 2C of the other example of the series of binding updates according to the embodiment of the present invention.

The HA2 receives the BAR message and completes a binding update. Because of this binding update processing, a loop route between the HA1 and the HA2 is formed as shown in FIG. 1E. In other words, a packet of which destination address is Addr1 and a packet to Addr2 make a loop between the HA1 and the HA2. However, in this case, the problem in the binding update procedure of the conventional MIP (Mobile IP) that the BA message is looped hence the BA message is not delivered to the MN is resolved. In this state, if the MN performs a binding update to the HA1, it is possible to avoid the state of a route with a loop reciprocating between the HAs.

In the embodiment of the present invention, it is also possible to newly add a state as a "change-in-progress state (corresponding to the above-mentioned change-in-progress flag)" to the BC of the HA as shown in FIG. 2C. The "change-in-progress state" means a state after the HA receives the BU message and transmits the BA message until the HA receives the BAR message. During the "change-in-progress state," forwarding of any packet is stopped. Note that, during the "change-in-progress state," a received packet may be discarded, or it may be stored and forwarded after completion of the "change-in-progress state" and completion of the binding update.

In the case where the "change-in-progress state" is set in the BC of the HA, if receiving the BU message, the HA2 changes the BC to a status (HoA2=Addr2, CoA2=Addr1, and the change-in-progress state), and transmits the BA message to the MN. The HA1 receives this BA message and forwards it to Addr2. The BA message forwarded to Addr2 is received by the HA2, and since the state of the BC is the "change-in-progress state," the HA2 does not forward the BA message. As shown in FIG. 2C, since the HA2 does not forward the BA message, the BA message is not delivered to the MN. Therefore, the MN knows that the binding update is not completed. Further, since the HA2 does not receive the BAR message from the MN, it cannot complete the binding update processing.

There are two methods to recover from this state. The first method is to wait until the "change-in-progress state" is canceled by timeout processing. In this case, the time period to maintain the "change-in-progress state" is predetermined, and when the predetermined time period has elapsed, the HA deletes this binding information. It is enough for the MN may transmit a new BU message after waiting for completion of the "change-in-progress state" and deletion of the BC (binding information).

The other one is to transmit a new BU message from the MN in order to delete or update the BC of the HA. In this case, the MN sets "0" to the "Lifetime" field in the BU message to delete the BC that was supposed to be updated. Alternatively, the MN checks the BU message previously transmitted, and transmits a new BU message modified not to cause a loop route. If the state of the BC is the "change-in-progress state," the HA does not forward any packet, and in this case, it accepts a new update.

As mentioned above, when the BAR message and the "change-in-progress state" are provided, the BA message is not delivered to the MN, and the BAR message is not delivered to the HA2. Therefore, when the HA2 receives the BU message, the BC is updated to add only the "change-in-progress state" after the BA message is transmitted to the MN (after the BA message goes through the HA2 itself). Then, upon receiving the BAR message from the MN, the BC may be updated to remove the "change-in-progress state." Even if only the "change-in-progress state" is provided without providing the function of the BAR message, the method can be implemented. Thus, the BA message is not looped.

Further, in the embodiment of the present invention, cookie information may be newly added to the BA message. In this case, the MN acquires a value of cookie from the received BA message, adds the same value to the BAR message, and transmits it. The MN transmits the BAR message after waiting for receiving of the BA message without fail. This makes it possible to prevent the problem that the loop route occurs between the HAs even if the MN transmits the BU message and the BAR message in succession without waiting for the BA message.

A solution containing the above-mentioned three points is as shown in FIG. 3. It is a basic that the MN returns the BAR message after receiving the BA message. At this time, cookie information may be included in the BA message so that the MN inserts the cookie information in the BAR message before transmitting the BAR message. Further, the function of the "change-in-progress state" may be added to the method for the MN to return the BAR message. Note that even a method of providing only the "change-in-progress state" without providing the function of the BAR message can implement this solution.

A sequence chart of messages for a new binding update method is shown in FIG. 4, and the transition of the BC of the HA when the "change-in-progress state" is provided is shown in FIG. 5A to FIG. 5C. FIG. 5A shows the BC before receiving the BU message, where the HoA is "Addr2," the CoA is "Addr3," and no state is set. It means that a packet addressed to Addr2 is forwarded to Addr3. FIG. 5B shows the BC after receiving the BU message and transmitting the BA message, where the HoA is "Addr2," the CoA is "Addr1," and the "change-in-progress state" is set. It means a state to stop forwarding. FIG. 5C shows the BC after that (for example, after receiving the BAR message), where the HoA is "Addr2," the CoA is "Addr1," and no state is set. It means that a packet addressed to Addr2 is forwarded to Addr1.

Next, an example of the format of the BAR message will be described with reference to FIG. 6. Like the BU message and the BA message, the BAR message is a message containing a mobility header. The mobility header is defined in RFC3775, and it is in a format as shown in FIG. 6, for example. The type of message is identified depending on the value set in "MH Type" in this mobility header. Since it is defined in RFC3775 as follows, a newly added BAR message needs to take a value other than the already set value.

The MH Type is set to 0: Binding Refresh Request, 1: Home Test Init, 2: Care-of Test Init, 3: Home Test, 4: Care-of Test, 5: Binding Update, 6: Binding Acknowledgement, or 7: Binding Error.

Next, an example of the format of message data of the BAR message is shown in FIG. 7. As shown in FIG. 7, the same value as the value set in the BU message and the BA message is set in a "sequence" filed, and the MN transmits it towards the HA. The "mobility option" is used like in the BU message and the BA message as defined in RFC3775.

Next, a case where cookie is added to the BA message will be described. First, an example of the format of the BA message defined in RFC3775 is shown in FIG. 8. Information of cookie is added to "Mobility Option" in this format. The mobility option containing the cookie information is in the same format as other mobility option defined in RFC3775, and it is in a format as shown in FIG. 9.

In the "Type" field, a value other than values defined in other mobility option is newly defined as a "BA Cookie" option. In the "BA Cookie" field, a 4-byte value created by the HA is set. If the MN includes the value of cookie in the BAR message, the mobility option containing this "BA Cookie" is included like the case of the BA message. The MN transmits, to the HA, the BAR message in which the same value as the value of cookie set by the HA in the BA message is set in this "BA Cookie" of the mobility option. Thus, the above is the description of examples of the message formats.

Referring next to FIG. 10, binding update processing by the HA (when the above-mentioned BAR message and "change-in-progress state" are provided) will be described. First, when receiving a BU message from the MN (S1001), the HA checks the MN as the source (i.e., it checks if it is from the MN as the source) (S1002). If it is correct (i.e., if the source is appropriate), the HA performs BC update processing, while if it is not correct, the HA discards the BU message (S1010) and ends processing. If it is correct, the HA updates the BC according to the BU message, and sets the state of the BC to the "change-in-progress state" (BC update processing) (S1003). Note that any packet delivered to the HoA during this "change-in-progress state" is not forwarded. Next, the HA transmits a BA message to the MN, and starts a timer to determine the timeout of the "change-in-progress state" (S1004).

Then, the HA determines whether a BAR message is received from the MN within a predetermined time period (before the timeout of the "change-in-progress state") (S1005). If it is determined that the BAR message has been received (although it is considered that the HA does not basically receive any BAR message as mentioned above, it is a case where the BC is updated to add only the "change-in-progress state" and the BAR message is received after the BA message is transmitted to the MN (i.e., after the BA message goes through the HA2 itself as mentioned above)), the HA completes the BC update processing (S1006), and starts forwarding of a packet addressed, for example, to the HoA of the MN (S1007). On the other hand, in a case where a new BU message is received without receiving the BAR message within the predetermined time period (before the timeout of the "change-in-progress state") (S1008), if "Lifetime"=0 is set in the BU message, where it means that the BU message is to delete the entry in the BC, the HA deletes the entry in the BC (S1009), and ends the BC update processing.

If the BU message is an update request of a new BC, the HA restarts the timer in response to the update request of the new BC. Further, if it is timed out during the "change-in-progress state" without receiving the BAR message (S1008), the HA deletes the entry of the BC (S1009), and ends the BC update processing.

Next, binding update processing by the MN will be described with reference to FIG. 11. The MN transmits the BU message (S1101), and waits until the BA message is returned as a reply. In this case, a limit is set to the time period to wait for the BA message, and a timer to grasp the time period is started (S1102). The MN determines whether the BA message is received within the time limit after the start of the timer (S1003). If receiving the BA message within the time limit (although it is considered that the MN does not basically receive any BA message as mentioned above, it is a case where the transmitted BA message is received after the BC is updated to add only the "change-in-progress state"), the MN transmits the BAR message (S1104), and ends the BC update processing.

On the other hand, if the BA message is not received after it runs past the time limit, it is considered that the BU message has not been delivered to the HA or that the binding ends up in a loop route and the BA message is not returned. Therefore, if the HoA is registered in plural HAs, the MN performs check processing (condition checking processing) to check whether there is a loop route between HAs (S1105). If a portion of the loop route is found, a BU message is transmitted to cancel the portion. It is considered that the BU message at this time is a message for deletion of the entry or updating to another care-of address (CoA). Alternatively, the MN may give up the BC update processing and end processing with doing nothing.

Referring next to FIG. 12, message processing related to the binding update processing by the HA (when the above-mentioned BAR message and "change-in-progress state" are provided) will be described. The HA receives a BU message at a message receiving unit 121 (corresponding to the above-mentioned receiving means). Then, according to the BU message, a binding information storing unit 122 (corresponding to the above-mentioned update means) updates binding information stored in itself. In this processing, check processing for the source MN is also performed. Further, upon updating of the binding information, the state is set to the "change-in-progress state." Then, a BA message generating unit 123 (corresponding to the above-mentioned message generating means) creates a reply message, and a message transmitting unit 124 (corresponding to the above-mentioned transmission means) transmits the created BA message. Further, after passing the BA message to the message transmitting unit 124, the BA message generating unit 123 notifies a BAR message waiting timer measuring unit 125 that the BA message has been transmitted, and the BAR message waiting timer measuring unit 125 starts a timer.

When the HA receives a BAR message at the message receiving unit 121 after the transmission of the BA message, the binding information storing unit 122 changes the binding update from the "change-in-progress state" to a complete state. Further, the BAR message waiting timer measuring unit 125 instructs stop of the timer. After the transmission of the BA message, if the timer runs past the time limit while waiting for the BAR message, the BAR message waiting timer measuring unit 125 instructs the binding information storing unit 122 to discard the binding information.

Referring next to FIG. 13, message processing related to the binding update processing by the MN (when the above-mentioned BAR message and "change-in-progress state" are provided) will be described. The MN creates a BU message in a BU message generating unit 133 (corresponding to the above-mentioned message generating means). The BU message is transmitted from a message transmitting unit 134 (corresponding to the above-mentioned transmission means). After passing the BU message to the message transmitting unit 134, the BU message generating unit 133 instructs a BA message waiting timer measuring unit 135 to start a timer. After the transmission of the BU message, the MN waits for a BA message. If receiving the BA message at a message receiving unit 131 (corresponding to the above-mentioned receiving means), the MN creates a BAR message in a BAR message generating unit 132 (corresponding to the above-mentioned message generating means), and transmits the BAR message from the message transmitting unit 134. Further, the message receiving unit 131 notifies the BA message waiting timer measuring unit 135 that the BA message has been received, and the BA message waiting timer measuring unit 135 stops the timer.

After the transmission of the BU message, if the BA message is not received, the BA message waiting timer measuring unit 135 notifies a binding condition checking unit 136 that the timer runs past the time limit. If the binding information is registered in plural HAs, the binding condition checking unit 136 checks whether a loop route occurs between HAs (i.e., it performs the above-mentioned condition checking processing). If the binding condition checking unit 136 finds a loop route between HAs, a BU message to delete the binding information is created by the BU message generating unit 133 and transmitted by the message transmitting unit 134, or a BU message to transmit new binding information to an HA is created by the BU message generating unit 133 and transmitted to the HA by the message transmitting unit 134. Thus, the above described the message processing related to the binding update processing with reference to the block diagrams (configuration diagrams) of the HA and the MN.

Next, other solutions for not causing a loop route in a binding between HAs will be described. At first, the first solution will be described. This solution is that the MN does not transmit the BU message. In other words, prior to transmission of the BU message, the MN checks whether such a binding condition that there is a loop between HAs is formed or not. Although this method is effective, if the MN intentionally creates and transmits a BU message to cause a loop, only this method cannot prevent occurrence of a loop route.

The second solution will be described. This solution is that the HA does not forward the inner packet if it is a BU message. When the BU message transmitted by the MN is multiple-encapsulated, an intermediate HA cannot check the content of the inner message. In the case of the example described, the HA2 cannot judges whether an inner packet is a BU message after decapsulating the packet addressed to Addr1 when forwarding the inner packet to HA1(Addr1). On the other hand, a HA that finally forwards the BU message, e.g., the HA1, could know whether the inner packet is a BU message. In this case, however, if the BU message is encrypted between the MN and the HA2, the HA1 that forwards the BU message cannot know if it is the BU message.

The case where the HA1 can confirm that the packet to be forwarded by the HA1 contains the BU message is further considered. The HA1 checks if the source address is a home address (Addr1) registered by the MN. In this case, since this HoA is registered in the HA2 as a care-of address (CoA), a loop route occurs between the HAs. However, this address cannot be set aside, because the fact that the source address of the packet to be forwarded is Addr1 registered by the MN as the HoA is correct for the HA1.

The HA1 checks the destination of the BU message that the HA1 is about to transmit. If the destination address is a HA, it is considered a method of not transmitting the BU message. However, since it is difficult to know all addresses of HAs, the method of not transmitting the BU message addressed to a HA is effective for a specific case only. Further, this method supports another specific case where the MN knows all addresses of HAs. It means that it is limited the case for the UE to utilize the HA, e.g. the multiple-HA (HA via HA). In this case, it is considered a method of checking "Home Address Destination Option" of the BU message that the HA1 is about to forward.

"Home Address Destination Option" is contained in the BU message. It is checked if a home address set in the "Home Address Destination Option" does not match the address registered in the HA1 as the care-of address (CoA). In the case of the example described, the address set in the "Home Address Destination Option" is Addr2 registered in the HA2 as the HoA, and the care-of address registered in the HA1 is also Addr2. Therefore, the HA1 can know that two addresses match and a loop occurs.

Thus, the HA can stop forwarding the BU message, preventing occurrence of a loop route. However, in such a situation that a loop occurs among three or more HAs, an address set in the "Home Address Destination Option" is a care-of address registered in another HA, so that it cannot be found by this method. In this case, it is also considered a method of checking if a "Home Registration Bit" of the BU message is set when the HA forwards the BU message.

Using this bit information, the HA can judge whether the BU message is addressed to a HA or a correspondent node (CN). However, in the case of using this method to judge whether the BU message should be forwarded or not, it is impossible for the MN to register binding information in many HAs, and to forward it in hierarchical condition. Therefore, it is considered a method of adding, to the BU message, information indicating that the HA has forwarded the BU message upon forwarding the BU message. This method lets the HA receiving the BU message know if any intermediate HA resides during forwarding of the BU message.

When the BU message is delivered via HAs, if it is updated to new binding information, a loop route may be formed. If HAs do not forward any BU messages, any loop route is not formed. However, in that case, the MN cannot utilize the multiple-HAs (HA via HA) if the MN requires it. In such a case, it is considered a method of sharing binding information among the HAs to check if the binding update does not make any loop route before updating the binding information.

The third solution will be described. This solution is that the HA does not transmit the BA message. It is considered a method, which causes the HA to check the BA message before transmission, and if a loop route occurs, the HA does not transmit the BA message. However, since it is difficult for the HA2 alone to judge whether a loop route is formed or not, the HA2 can cooperate the HA1 or other entities by sharing binding information among them, and the HA2 can check if the binding update does not make any loop route.

The fourth solution will be described. This solution is that the HA does not forward the BA message. In the conventional binding update procedure, when the BA message is delivered to the HA1, the BC has been already updated and a loop has been formed. However, the problem that the BA message makes a loop between HAs does not occur yet. If the BA message transmitted from the HA2 is not encrypted for the MN, the HA1 can know that the message is the BA message. However, it is difficult for the HA1 to determine whether a loop is formed from the destination address and the source address of the BA message. Therefore, it is considered a method of not forwarding all BA messages. However, this method makes it impossible for the MN to utilize multiple-HAs(HA via HA).

The fifth solution will be described. This solution is that the HA does not update the BC. In other words, the BC is not updated until the content of the required BC can be confirmed. As a check method, it is considered a method of confirming that the BA message transmitted to a care-of address has been delivered to the MN. As a confirmation method, there is a method of adding a BAR message described in the embodiment of the present invention.

The sixth solution will be described. This solution is that HAs share binding information with one another. By sharing binding information among the HAs, it is checked if a loop is formed by the binding information shared among one another. However, it seems difficult to share this information among all HAs.

It is also considered a method of sharing binding information between HAs on routes of the binding messages (BU message and BA message). For example, the HA puts the information that the sender is a home agent in the header of the outer packet. The packet is normally delivered to the MN, but when the destination address of this packet is registered as the HoA, the HA performs receiving processing on this packet. This receiving processing makes it possible to know the addresses of HAs from the source address, and hence to share binding information among these HAs. Further, the MN makes a list of HAs that the MN uses, and the MN informs the HAs of the list. This allows each HA to know other HAs that it should share the binding information.

The seventh solution will be described. This is a method of making another entity have information and judge whether the binding update does not cause any loop route. For example, a server is prepared on a network and the HA registers binding information in the server. The server performs check processing to check if there are any loop routes between HAs. Before the binding update, the HA asks this server whether the binding update makes any loop routes. The HA prevents from making any loop routes. Thus, the above described possible other solutions.

Thus, the above described the embodiment of the present invention. Each functional block used in the explanations of embodiment of the present embodiment, described above, can be realized as a large scale integration (LSI) that is typically an integrated circuit. Each functional block can be individually formed into a single chip. Alternatively, some or all of the functional blocks can be included and formed into a single chip. Although referred to here as the LSI, depending on differences in integration, the integrated circuit can be referred to as the integrated circuit (IC), a system LSI, a super LSI, or an ultra LSI. The method of forming the integrated circuit is not limited to LSI and can be actualized by a dedicated circuit or a general-purpose processor. A field programmable gate array (FPGA) that can be programmed after LSI manufacturing or a reconfigurable processor of which connections and settings of the circuit cells within the LSI can be reconfigured can be used. Furthermore, if a technology for forming the integrated circuit that can replace LSI is introduced as a result of the advancement of semiconductor technology or a different derivative technology, the integration of the functional blocks can naturally be performed using the technology. For example, the application of biotechnology is a possibility.

INDUSTRIAL APPLICABILITY

The binding update method, the mobile terminal, the home agent, and the binding system according to the present invention can resolve such a situation that the BA message is forwarded in a loop between HAs, and they are useful for a binding update method, a mobile terminal, a home agent, and a binding system in a communication system for performing wireless communication using a mobile IP (Mobile Internet Protocol).

The invention claimed is:

1. A binding update method, comprising:
transmitting, from a mobile terminal to a home agent of the mobile terminal, a first message containing a new address that is a destination to which the home agent forwards;
updating, by the home agent, based on the first message, a cache in which a home address of the mobile terminal is associated with an address to which the home agent forwards;
transmitting, from the home agent, a second message, as a reply to the first message, to the mobile terminal;
transmitting, from the mobile terminal to the home agent when receiving the second message, a third message notifying that the second message has been received, wherein
updating the cache, by home agent, occurs after receiving the third message, and
wherein the home agent of the mobile terminal sets, in the cache, a change-in-progress flag indicating that a received message is not forwarded during updating of the cache based on the first message, the home agent of the mobile terminal does not forward the received message while the change-in-progress flag is set.

2. The binding update method according to claim 1, further comprising:
adding, by the home agent, identification information to the second message, and
adding to the third message, by the mobile terminal, the identification information added to the second message.

3. A mobile terminal, comprising:
message transmitting means for transmitting messages to a home agent of the mobile terminal;
message receiving means for receiving messages from the home agent; and
message generating means for generating the messages to be transmitted to the home agent, wherein
the message generating means generates a first message containing a new address that is a destination to which the home agent forwards and the message transmitting means transmits the first message to the home agent which updates, based on the first message, a cache in which a home address of the mobile terminal is associated with an address which the home agent forwards,
the message receiving means receives a second message, transmitted by the home agent as a reply to the first message, and
the message generating means generates a third message notifying that the second message has been received when the message receiving means receives the second message and the message transmitting means transmits the third message to the home agent of the mobile terminal.

4. The mobile terminal according to claim 3, wherein when identification information is added to the second message, the message generating means adds, to the third message, the identification information added to the second message.

5. A home agent of a mobile terminal, comprising:
message generating means for generating messages to be transmitted to the mobile terminal;
message transmitting means for transmitting generated messages to the mobile terminal;
message receiving means for receiving messages transmitted by the mobile terminal; and
cache updating means for updating a cache in which a home address of the mobile terminal is associated with an address to which the home agent forwards, wherein
the message receiving means receives, from the mobile terminal, a first message containing a new address that is a destination to which the home agent forwards and the cache updating means updates the cache, based on the first message,
the message generating means generates a second message and the message transmitting means transmits the second message, as a reply to the first message, to the mobile terminal,
the message receiving means receives, from the mobile terminal, a third message notifying that the second message has been received, and the cache updating means updates the cache when the third message is received by the message receiving means and sets, in the cache, a change-in-progress flag indicating that a received message is not to be forwarded during updating of the cache based on the first message, wherein the message transmitting means does not forward the received message while the change-in-progress flag is set.

6. The home agent according to claim 5, wherein the message generating means adds identification information to the second message.

7. A binding update system, comprising:
a mobile terminal; and
a home agent of the mobile terminal, wherein
the mobile terminal is configured to transmit, to the home agent, a first message containing a new address that is a destination to which the home agent forwards,
the home agent is configured to update, based on the first message, a cache in which a home address of the mobile terminal is associated with an address to which the home agent forwards and to transmit a second message, as a reply to the first message, to the mobile terminal,
the mobile terminal is further configured to transmit, when receiving the second message, a third message notifying that the second message has been received, and
after receiving the third message, the home agent updates the cache,
wherein the home agent of the mobile terminal sets, in the cache, a change-in-progress flag indicating that a received message is not forwarded during updating of the cache based on the first message, the home agent of the mobile terminal does not forward the received message while the change-in-progress flag is set.

8. The binding update system according to claim 7, wherein
the home agent of the mobile terminal adds identification information to the second message, and
the mobile terminal adds, to the third message, the identification information added to the second message.

* * * * *